United States Patent
Rizvi et al.

(10) Patent No.: US 9,676,884 B2
(45) Date of Patent: *Jun. 13, 2017

(54) HIGH-VISCOSITY ALPHA-OLEFIN COPOLYMER COMPOSITIONS AND METHODS OF MAKING AND USING THE SAME

(71) Applicant: Elevance Renewable Sciences, Inc., Woodridge, IL (US)

(72) Inventors: Syed Q. Rizvi, Woodridge, IL (US); Debra Tindall, Pendleton, SC (US); Georgeta Hategan, Woodridge, IL (US); Kristine Counter, Woodridge, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/204,955

(22) Filed: Mar. 11, 2014

(65) Prior Publication Data

US 2014/0274844 A1    Sep. 18, 2014

Related U.S. Application Data

(60) Provisional application No. 61/783,083, filed on Mar. 14, 2013, provisional application No. 61/881,742, (Continued)

(51) Int. Cl.
C07C 69/34    (2006.01)
C08F 220/10    (2006.01)
(Continued)

(52) U.S. Cl.
CPC .......... *C08F 210/14* (2013.01); *C08F 220/68* (2013.01); *C10M 107/28* (2013.01);
(Continued)

(58) Field of Classification Search
CPC ... C10M 2207/282; C08F 210/02; C08F 8/00; C08C 19/02
(Continued)

(56) References Cited

U.S. PATENT DOCUMENTS

2010/0145086 A1    6/2010    Schrodi et al.
2011/0160472 A1    6/2011    Lemke et al.
(Continued)

FOREIGN PATENT DOCUMENTS

WO    WO 2012/129479 A2    9/2012

OTHER PUBLICATIONS

Jönsson et al., "Nomenclature for Non-Linear Chromatography" Pure & App. Chem,, vol. 68, No. 8, pp. 1591-1595, 1996.
(Continued)

*Primary Examiner* — Vishal Vasisth
(74) *Attorney, Agent, or Firm* — Kilpatrick Townsend & Stockton LLP

(57) ABSTRACT

Copolymers of alpha-olefins are generally disclosed, including methods of making such copolymers. In some embodiments, copolymers of alpha-olefins and certain unsaturated ester compounds are also disclosed, including methods of making such copolymers. Lubricant compositions including copolymers of alpha-olefins are also disclosed, as well as methods of using such compositions in certain lubricant applications.

18 Claims, 4 Drawing Sheets

Related U.S. Application Data filed on Sep. 24, 2013, provisional application No. 61/941,310, filed on Feb. 18, 2014.

(51) Int. Cl.
    *C08C 19/00*     (2006.01)
    *C08C 19/02*     (2006.01)
    *C08F 210/14*     (2006.01)
    *C10M 145/12*     (2006.01)
    *C10M 107/28*     (2006.01)
    *C08F 220/68*     (2006.01)

(52) U.S. Cl.
CPC .... *C10M 145/12* (2013.01); *C10M 2205/028* (2013.01); *C10M 2205/0285* (2013.01); *C10N 2220/022* (2013.01); *C10N 2230/02* (2013.01); *C10N 2240/02* (2013.01); *C10N 2240/04* (2013.01); *C10N 2240/10* (2013.01); *C10N 2240/102* (2013.01); *C10N 2240/105* (2013.01)

(58) Field of Classification Search
USPC .................. 508/465; 525/338, 384; 526/329
See application file for complete search history.

(56) References Cited

U.S. PATENT DOCUMENTS

2012/0071676 A1     3/2012     Schrodi
2012/0264664 A1*   10/2012   DiBiase et al. ............... 508/186

OTHER PUBLICATIONS

Schrock et al., "Molybdenum and Tungsten Imido Alkylidene Complexes as Efficient Olefin-Metathesis Catalysts" Angew, Chem. Int. Ed., 42, 2003, pp. 4592-4633.

Schrock, "High Oxidation State Multiple Metal-Carbon Bonds" Chem. Rev., 102, 2002, pp. 145-179.

Schrock, "Recent Advances in High Oxidation State Mo and W Imido Alkylidene Chemistry" Chem. Rev., 109, 2009, pp. 3211-3226.

International Search Report and Written Opinion of the International Searching Authority issued in PCT Patent Application No. PCT/US2014023530, mailed May 27, 2014, 11 pages.

* cited by examiner

HIGH-VISCOSITY ALPHA-OLEFIN COPOLYMER COMPOSITIONS AND METHODS OF MAKING AND USING THE SAME

CROSS-REFERENCE TO RELATED APPLICATIONS

The present application claims the benefit of priority of: U.S. Provisional Patent Application No. 61/783,083, filed Mar. 14, 2013; U.S. Provisional Patent Application No. 61/881,742, filed Sep. 24, 2013; and U.S. Provisional Patent Application No. 61/941,310, filed Feb. 18, 2014; each of which is hereby incorporated by reference in its entirety as though fully set forth herein.

TECHNICAL FIELD

Alpha-olefin copolymer compositions are generally disclosed, as well as methods of making and using such copolymers. In some embodiments, the copolymer compositions include the reaction products of alpha-olefins and certain functionalized olefins, such as ester-functionalized olefins. Lubricant compositions including the alpha-olefin copolymer compositions are also disclosed, as well as methods of using such compositions in certain lubricant formulations and applications.

BACKGROUND

Lubricant compositions are used to reduce friction between moving surfaces. Such compositions can also assist with heat transfer, provide a medium for carrying away contaminants and debris, transmit power, and protect against wear and corrosion. As such, lubricant compositions can be used in a variety of different contexts. For example, lubricant compositions, in the form of a motor oil, can be used to reduce friction in various engine types, such as internal combustion engines. Lubricant compositions are also used to lubricate gear boxes, crank cases, transmissions, diesel engines, two-cycle engines, and various bearings.

Lubricant compositions have historically included a major amount of a base oil, such as mineral oil or some other petroleum fraction, which is mixed with one or more additives. The additives may improve the lubricating properties of the composition, and may also confer other beneficial properties on the composition, such as corrosion inhibition, wear resistance, and the like. Conventional base oils may impose certain limitations on the lubricating performance of the composition. Thus, conventional base oils can be partially or wholly replaced by synthetic base oils. Such synthetic base oils include polyalphaolefins (PAOs), polyesters, and alkylated benzenes and naphthalenes. While synthetic base oils can offer certain advantages over conventional base oils, limitations persist. Therefore, there is a continuing need to develop new base oil compositions that can offer certain performance advantages over compositions that are currently available on the market. Such performance advantages can include, among other features, improved viscosity performance at low and high temperatures and improved thermo-oxidative stability.

Novel alpha-olefin copolymer compositions are generally disclosed herein. Such copolymer compositions offer an attractive alternative to materials presently used in synthetic base oils, especially in instances where a higher viscosity (e.g., having a kinematic viscosity of at least 25 centistokes at 100° C.) lubricant may be desired.

SUMMARY

In a first aspect, the disclosure provides compositions, comprising: a copolymer comprising constitutional units formed from two or more monomers, the two or more monomers comprising a first monomer, which is an alpha-olefin having 8 to 18 carbon atoms, or mixtures thereof, and a second monomer, which is an ester-alkene molecule; where the composition has a kinematic viscosity at 100° C. of 25 to 200 centistokes. In some embodiments, the alpha-olefin has 10 to 18 carbon atoms. In some embodiments, the ester-alkene molecule is an α-ester-alk-ω-ene molecule.

In a second aspect, the disclosure provides lubricant compositions, comprising: a composition of the first aspect. In some embodiments, the lubricant composition further comprises a diluent. In some embodiments, the lubricant compositions comprise one or more additives.

In a third aspect, the disclosure provides methods for making a lubricant composition, the methods comprising: providing a composition of the first aspect and a diluent, where the diluent is miscible with the composition; and mixing the composition and the diluent to form a diluted composition. In some embodiments, the methods comprise mixing one or more additives into the composition, either before, during, and/or after dilution.

In a fourth aspect, the disclosure provides methods for making a lubricant composition, the methods comprising: providing a composition of the first aspect and one or more additives; and mixing the composition and the one or more additives to form a first lubricant composition. In some embodiments, the methods comprise mixing a diluent into the composition, either before, during, and/or after addition of the additives.

In a fifth aspect, the disclosure provides compositions, comprising: a copolymer comprising constitutional units formed from two or more monomers, the two or more monomers comprising a first monomer, which is an alpha-olefin having 8 to 18 carbon atoms, or mixtures thereof, and a second monomer, which is an ester-alkene molecule; where one or more of the ester groups in the constitutional unit formed from the second monomer has been derivatized to a different functional group. For example, in some embodiments, one or more of said ester groups have been converted to a carboxylate anion (e.g., a carboxylate salt). In some other embodiments, one or more of said ester groups have been converted to amides. These transformations can be performed either before or after polymerization of the ester-alkene molecule with the alpha-olefin. In some embodiments, the alpha-olefin has 10 to 18 carbon atoms. In some embodiments, the ester-alkene molecule is an α-ester-alk-ω-ene molecule.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
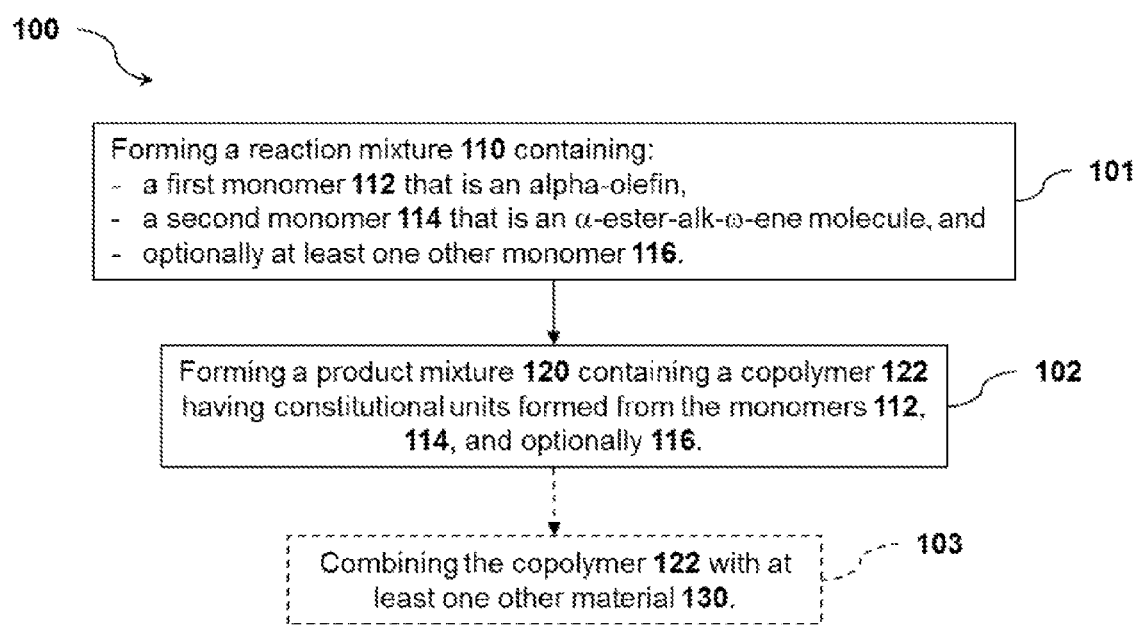
FIG. 1 depicts a method of making a lubricant composition.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks.

As used herein, "monomer" refers to a substance that can undergo a polymerization reaction to contribute constitutional units to the chemical structure of a polymer.

As used herein, "copolymer" refers to a polymer having constitutional units formed from more than one species of monomer.

As used herein, "reaction" and "chemical reaction" refer to the conversion of a substance into a product, irrespective of reagents or mechanisms involved.

As used herein, "reaction product" refers to a substance produced from a chemical reaction of one or more reactant substances.

As used herein, "yield" refers to the amount of reaction product formed in a reaction. When expressed with units of percent (%), the term yield refers to the amount of reaction product actually formed, as a percentage of the amount of reaction product that would be formed if all of the limiting reactant were converted into the product.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "metathesis catalyst" includes any catalyst or catalyst system that catalyzes an olefin metathesis reaction.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9, 12-octadecadienoic acid), and linolenic acid (9,12,15-octadecatrienoic acid).

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths.

As used herein, "alcohol" or "alcohols" refer to compounds having the general formula: R—OH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "alcohol" or "alcohols" may refer to a group of compounds with the general formula described above, wherein the compounds have different carbon lengths. The term "hydroxyl" refers to a —OH moiety.

As used herein, "aldehyde" or "aldehydes" refer to compounds having the general formula: R—CHO, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "aldehydes" may refer to a group of compounds with the general formula described above, wherein the compounds have different carbon lengths. The term "formyl" refers to a —CHO moiety.

As used herein, "acid" or "acids" refer to compounds having the general formula: R—COOH, wherein R denotes any organic moiety (such as alkyl, aryl, or silyl groups), including those bearing heteroatom-containing substituent groups. In certain embodiments, R denotes alkyl, alkenyl, aryl, or alcohol groups. In certain embodiments, the term "acids" may refer to a group of compounds with the general formula described above, wherein the compounds have different carbon lengths. The term "carboxyl" refers to a —COOH moiety. The term "carboxylated" refers to a "carboxyl" group formed on another group or compound.

As used herein, "amine" or "amines" refer to compounds having the general formula: R—N(R')(R''), wherein R, R', and R'' denote a hydrogen or an organic moiety (such as alkyl, aryl, or silyl groups), including those bearing heteroatom-containing substituent groups. In certain embodiments, R, R', and R'' denote a hydrogen or an alkyl, alkenyl, aryl, or alcohol groups. In certain embodiments, the term "amines" may refer to a group of compounds with the general formula described above, wherein the compounds have different carbon lengths. The term "amino" refers to a —N(R)(R') moiety.

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 8 carbon atoms.

As used herein, "alpha-olefin" refers to an olefin (as defined above) that has a terminal carbon-carbon double bond. In some embodiments, the alpha-olefin is a terminal alkene, which is an alkene (as defined above) having a terminal carbon-carbon double bond. Additional carbon-carbon double bonds can be present.

As used herein, an "ester-alkene molecule" refers to an alkene (including terminal and internal alkenes, and polyunsaturated alkenes), which also includes an ester functional group (i.e., —C(=O)—OR, where R is an organic group). As used herein, "α-ester-alk-ω-ene molecule" refers to a terminal alkene (as defined above), which also includes an ester functional group (i.e., —C(=O)—OR, where R is an organic group), where there is at least one saturated carbon lying between the non-terminal carbon of the terminal carbon-carbon double bond and the carbonyl carbon of the ester functional group. The at least one saturated carbon can be substituted or unsubstituted. Non-limiting examples include compounds such as 3-butenoic acid alkyl esters, 4-pentenoic acid alkyl esters, 6-heptenoic acid alkyl esters, 9-decenoic acid alkyl esters, and 12-tridecenoic acid alkyl esters. In like manner, as used herein, "α-(carboxylic acid)-alk-ω-ene molecule" refers to a terminal alkene (as defined above), which also includes a carboxyl functional group (i.e., —CO$_2$H), where there is at least one saturated carbon lying between the non-terminal carbon of the terminal carbon-carbon double bond and the carbonyl carbon of the carboxyl functional group. Also, as used herein, an "alk-ω- ene molecule" refers to a terminal alkene (as defined above), which also includes another functional group (e.g., amine, hydroxyl, aldehyde, etc.), where there is at least one saturated carbon lying between the non-terminal carbon of the terminal carbon-carbon double bond and the functional group (e.g., the carbonyl carbon of a carbonyl-containing functional group, or the heteroatom of a non-carbonyl-containing functional group).

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number carbon atoms in an alkyl group is represented by the phrase "$C_{x-y}$ alkyl," which refers to an alkyl group, as herein defined, containing from x to y, inclusive, carbon atoms. Thus, "$C_{1-6}$alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl group can be replaced by a heteroatom (e.g., selected from nitrogen, oxygen, or sulfur, including N-oxides, sulfur oxides, and sulfur dioxides, where feasible), and is referred to as a "heteroalkyl" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number carbon atoms in an alkenyl group is represented by the phrase "$C_{x-y}$alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group. Also, in some instances, one or more of the saturated carbon atoms in the alkenyl group can be replaced by a heteroatom (e.g., selected from nitrogen, oxygen, or sulfur, including N-oxides, sulfur oxides, and sulfur dioxides, where feasible), and is referred to as a "heteroalkenyl" group.

As used herein, "alkynyl" refers to a straight or branched chain non-aromatic hydrocarbon having 2 to 30 carbon atoms and having one or more carbon-carbon triple bonds, which may be optionally substituted, as herein further described, with multiple degrees of substitution being allowed. Examples of "alkynyl," as used herein, include, but are not limited to, ethynyl, 2-propynyl, 2-butynyl, and 3-butynyl. The number carbon atoms in an alkynyl group is represented by the phrase "$C_{x-y}$alkynyl," which refers to an alkynyl group, as herein defined, containing from x to y, inclusive, carbon atoms. Thus, "$C_{2-6}$alkynyl" represents an alkynyl chain having from 2 to 6 carbon atoms and, for example, includes, but is not limited to, ethynyl, 2-propynyl, 2-butynyl, and 3-butynyl. In some instances, the "alkynyl" group can be divalent, in which case the group can alternatively be referred to as an "alkynylene" group. Also, in some instances, one or more of the saturated carbon atoms in the alkynyl group can be replaced by a heteroatom (e.g., selected from nitrogen, oxygen, or sulfur, including N-oxides, sulfur oxides, and sulfur dioxides, where feasible), and is referred to as a "heteroalkynyl" group.

As used herein, "aryl" refers to a 6- to 30-membered cyclic, aromatic hydrocarbon, which may be optionally substituted as herein further described, with multiple degrees of substitution being allowed. Examples of "aryl" groups as used herein include, but are not limited to, phenyl and naphthyl. As used herein, the term "aryl" also includes ring systems in which a phenyl or naphthyl group is optionally fused with one to three non-aromatic, saturated or unsaturated, carbocyclic rings. For example, "aryl" would include ring systems such as indene, with attachment possible to either the aromatic or the non-aromatic ring(s). As used herein, "arylalkyl" refers to an alkyl substituent (as defined above), which is further substituted by one or more (e.g., one to three) aryl groups (as herein defined). Analogously, "alkylaryl" refers to an aryl substituent, which is further substituted by one or more (e.g., one to five) alkyl groups.

As used herein, the term "heteroaryl" refers to a 5- to 30-membered mono- or polycyclic ring system, which contains at least one aromatic ring and also contains one or more heteroatoms. Such "heteroaryl" groups may be optionally substituted as herein further described, with multiple degrees of substitution being allowed. In a polycyclic "heteroaryl" group that contains at least one aromatic ring and at least one non-aromatic ring, the aromatic ring(s) need not contain a heteroatom. Thus, for example, "heteroaryl," as used herein, would include indolinyl. Further, the point of attachment may be to any ring within the ring system without regard to whether the ring containing the attachment point is aromatic or contains a heteroatom. Thus, for example, "heteroaryl," as used herein, would include indolin-1-yl, indolin-3-yl, and indolin-5-yl. Examples of heteroatoms include nitrogen, oxygen, or sulfur atoms, including N-oxides, sulfur oxides, and sulfur dioxides, where feasible. Examples of "heteroaryl" groups, as used herein include, but are not limited to, furyl, thiophenyl, pyrrolyl, oxazolyl, thiazolyl, imidazolyl, isoxazolyl, isothiazolyl, 1,2,4-triazolyl, pyrazolyl, pyridinyl, pyridazinyl, pyrimidinyl, indolyl, isoindolyl, benzo[b]thiophenyl, benzimidazolyl, benzothiazolyl, pteridinyl, and phenazinyl, where attachment can occur at any point on said rings, as long as attachment is chemically feasible. Thus, for example, "thiazolyl" refers to thiazol-2-yl, thiazol-4-yl, and thiaz-5-yl. As used herein, "heteroarylalkyl" refers to an alkyl substituent (as defined above), which is further substituted by one or more (e.g., one to three) heteroaryl groups (as herein defined). Analogously, "alkylheteroaryl" refers to an aryl substituent, which is further substituted by one or more (e.g., one to five) alkyl groups.

As used herein, "alkoxy" refers to —OR, where R is an alkyl group (as defined above). The number carbon atoms in an alkyl group is represented by the phrase "$C_{x-y}$alkoxy," which refers to an alkoxy group having an alkyl group, as herein defined, containing from x to y, inclusive, carbon atoms.

As used herein, "halogen" or "halo" refers to fluorine, chlorine, bromine, and/or iodine. In some embodiments, the terms refer to fluorine and/or chlorine. As used herein, "haloalkyl" or "haloalkoxy" refer to alkyl or alkoxy groups, respectively, substituted by one or more halogen atoms. The terms "perfluoroalkyl" or "perfluoroalkoxy" refer to alkyl groups and alkoxy groups, respectively, where every available hydrogen is replaced by fluorine.

As used herein, "substituted" refers to substitution of one or more hydrogens of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week, or a compound which maintains its integrity long enough to be useful for therapeutic or prophylactic administration to a patient. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, "kinematic viscosity," for example, measured at a particular temperature, refers to the value obtained when the kinematic viscosity is measured according to Test Method No. D445-11a of the American Society for Testing and Materials (ASTM), published by the ASTM, West Conshohocken, Pa., USA.

As used herein, "Brookfield viscosity," for example, measured at a particular temperature, refers to the value obtained when the Brookfield viscosity is measured according to Test Method No. D2983-09 of the American Society for Testing and Materials (ASTM), published by the ASTM, West Conshohocken, Pa., USA.

As used herein, "viscosity index" refers to a change in viscosity of a material with respect to temperature, as measured according to Test Method No. D2270 of the American Society for Testing and Materials (ASTM), published by the ASTM, West Conshohocken, Pa., USA.

As used herein, "aniline point" refers to the temperature at which equal volumes of aniline and a test material (e.g., an oil) are miscible, as measured according to Test Method No. D611-12 of the American Society for Testing and Materials (ASTM), published by the ASTM, West Conshohocken, Pa., USA.

As used herein, property values expressed as ranges means that the property can have any value between and including the recited endpoints. For example, the phrase "has a kinematic viscosity at 100° C. of 25 to 100 centistokes" means that at 100° C. the kinematic viscosity can have any value not less than 25 centistokes and not more than 100 centistokes. The recitation of such ranges in no way limits application of the doctrine of equivalents.

In some instances, property values may be expressed using open-ended ranges. For example, the phrase "has a kinematic viscosity at 100° C. of at least 40 centistokes" means that at 100° C. the kinematic viscosity can have any value not less than 40 centistokes and less than a value when the composition would cease to serve its intended utility, as understood by those of ordinary skill in the art.

As used herein, the various functional groups represented will be understood to have a point of attachment at the functional group having the hyphen or dash (-) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Lubricants Having Components Derived from Renewable Feedstocks

Due to the non-renewability of petroleum-based materials, such as those used in conventional base oils or many synthetic base oils, it may be desirable to obtain some of the components of a lubricant composition from certain renewable feedstocks. For example, in some embodiments, one or more components of a base oil can be obtained from certain renewable feedstocks, such as natural oils and their derivatives.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

Renewable feedstocks for lubricants may include unsaturated compounds having a polymerizable carbon-carbon double bond. In some embodiments, the polymerizable carbon-carbon double bond is in a terminal position. These unsaturated compounds can include a variety of compounds, including olefinic hydrocarbons and olefinic ester compounds. These unsaturated compounds may be used as monomers in polymerization reactions, either alone or in combination with other monomers and additives, to provide higher molecular weight substances that can be used for certain purposes, such as a lubricant base oil or additive. The unsaturated compounds may be polymerized alone to form homopolymers, or they may be polymerized with other comonomers to form copolymers. Other comonomers may include substances formed from conventional petrochemical feedstocks. Such compounds can also be used in certain personal care applications, for example, as emollients, emulsifiers, solubilizers, and the like.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

Olefin Metathesis of Renewable Feedstocks

As noted above, olefin metathesis can be used to make one or more of the monomers that may be used in the polymers disclosed herein. In some embodiments, one or more of these monomers are made by metathesizing a natural oil. Any suitable natural oil or natural oil derivative can be used. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene, among other products, is formed. Following transesterification, for example, with an alkyl alcohol, an amount of 9-denenoic acid methyl ester is formed. In some such embodiments, a separation step may occur between the metathesis and the transesterification, where the alkenes are separated from the esters. In some other embodiments, transesterification can occur before metathesis, and the metathesis is performed on the transesterified product.

As noted below, the copolymers disclosed herein can include repeating units that are formed from an ester-alkene molecule, such as an α-ester-alk-ω-ene molecule. Some amount of these monomers can be made by refining a natural oil. The ester-alkene molecule may be formed by a metathesis reaction of a natural oil containing unsaturated polyol esters, including a cross-metathesis reaction of a natural oil or a natural oil derivative with an alpha-olefin or with ethylene. The ester-alkene molecule may be formed by a metathesis reaction of a metathesized natural oil containing unsaturated polyol esters, including a cross-metathesis reaction of a metathesized natural oil with an alpha-olefin or with ethylene. Examples of cross-metathesis reactions of natural oils, natural oil derivatives and/or of metathesized natural oils that can produce substances including terminal alkenyl groups are described in US 2010/0145086 and in US 2012/0071676, which are incorporated by reference herein in their entirety, except that in the event of any inconsistent disclosure or definition from the present specification, the disclosure or definition herein shall be deemed to prevail.

The ester-alkene molecule (e.g., the α-ester-alk-ω-ene molecule) may be formed by a cross-metathesis reaction of a natural oil, a natural oil derivative and/or a metathesized natural oil containing unsaturated polyol esters with an organic compound containing a terminal alkenyl group, or with ethylene. An organic compound containing a terminal alkenyl group is a compound having an alkene group, where a first carbon of the alkene group is unsubstituted and a second carbon of the alkene group is substituted with one or two non-hydrogen substituents. The compound may include from 3 to about 20 carbon atoms, about 10 carbon atoms, about 6 carbon atoms, or about 3 carbon atoms. A cross-metathesis reaction may involve a single species of the compound containing a terminal alkenyl group, or it may involve a mixture of such species of the compound.

As an example, a compound containing a terminal alkenyl group for use in cross-metathesis may have the structure $H_2C=C(R^a)(R^b)$, where $R^a$ and $R^b$ are independently hydrogen, a hydrocarbon group, or a heteroalkyl group, provided that at least one of $R^a$ and $R^b$ is not hydrogen. The heteroatoms of a heteroalkyl group may be present as part of a functional group substituent. $R^a$ and $R^b$ may be linked to form a cyclic structure. In some embodiments, $R^a$ and $R^b$ are independently selected from $C_{1-20}$ alkyl, $C_{2-20}$ alkenyl, $C_{2-20}$ alkynyl, $C_{1-20}$ heteroalkyl, $C_{2-20}$ heteroalkenyl, $C_{2-20}$ heteroalkynyl, $C_{6-24}$ aryl, $C_{6-24}$ alkylaryl, $C_{6-24}$ arylalkyl, $C_{5-24}$ heteroaryl, and $C_{6-24}$ heteroalkylaryl, $C_{6-24}$ heteroarylalkyl.

Examples of compounds containing a terminal alkenyl group that may be used in cross-metathesis include 1-propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and larger alpha-olefins; 2-propenol, 3-butenol, 4-pentenol, 5-hexenol, 6-heptenol, 7-octenol, 8-nonenol, 9-decenol, 10-undecenol, 11-dodecenol, 12-tridecenol, 13-tetradecenol, 14-pentadecenol, 15-hexadecenol, 16-heptadecenol, 17-octadecenol, 18-nonadecenol, 19-eicosenol and larger alpha-alkenols; 2-propenyl acetate, 3-butenyl acetate, 4-pentenyl acetate, 5-hexenyl acetate, 6-heptenyl acetate, 7-octenyl acetate, 8-nonenyl acetate, 9-decenyl acetate, 10-undecenyl acetate, 11-dodecenyl acetate, 12-tridecenyl acetate, 13-tetradecenyl acetate, 14-pentadecenyl acetate, 15-hexadecenyl acetate, 16-heptadecenyl acetate, 17-octadecenyl acetate, 18-nonadecenyl acetate, 19-eicosenyl acetate and larger alpha-alkenyl acetates; 2-propenyl chloride, 3-butenyl chloride, 4-pentenyl chloride, 5-hexenyl chloride, 6-heptenyl chloride, 7-octenyl chloride, 8-nonenyl chloride, 9-decenyl chloride, 10-undecenyl chloride, 11-dodecenyl chloride, 12-tridecenyl chloride, 13-tetradecenyl chloride, 14-pentadecenyl chloride, 15-hexadecenyl chloride, 16-heptadecenyl chloride, 17-octadecenyl chloride, 18-nonadecenyl chloride, 19-eicosenyl chloride and larger alpha-alkenyl chlorides, bromides, and iodides; allyl cyclohexane, allyl cyclopentane; and the like. Examples of disubstituted compounds containing a terminal alkenyl group that may be used in cross-metathesis include isobutylene, 2-methylbut-1-ene, 2-methylpent-1-ene, 2-methylhex-1-ene, 2-methylhept-1-ene, 2-methyloct-1-ene, and the like.

Any combination of any of these compounds containing a terminal alkenyl group may be used in a cross-metathesis reaction with a natural oil, a natural oil derivative and/or a metathesized natural oil containing unsaturated polyol esters, to provide the α-ester-alk-ω-ene molecule. In an some embodiments, a composition including 9-decenoic acid methyl ester (9-DAME), which is an α-ester-alk-ω-ene molecule, can be prepared by the cross-metathesis of ethylene, 1-propene, 1-butene, and the like with a natural oil, a natural oil derivative and/or a metathesized natural oil containing unsaturated polyol esters. For example, oleic acid and/or methyl oleate may undergo cross-metathesis with the terminal alkene to provide a composition including 9-DAME. Due to the stoichiometry of the cross-metathesis reaction, the product composition can include amounts of other esters. For example, when propylene is used in the cross-metathesis with an oleate, esters of 9-undecenoic acid are formed. And when 1-butene is used, esters of 9-dodecenoic acid are formed.

In some embodiments, the α-ester-alk-ω-ene molecule is a compound of formula (I):

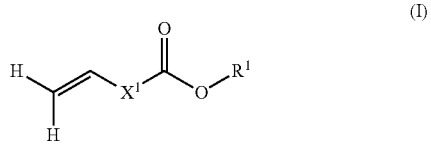

(I)

wherein
R$^1$ is C$_{1-12}$ alkyl, which is optionally substituted one or more times by substituents selected independently from R$^2$;
R$^2$ is halogen, —OH, C$_{1-6}$alkoxy, —NH$_2$, —NH(C$_{1-6}$alkyl), —N(C$_{1-6}$alkyl)$_2$, C$_{1-6}$ haloalkyl, or C$_{1-6}$ haloalkoxy; and
X$^1$ is C$_{1-24}$alkylene or C$_{2-24}$alkenylene, each of which is optionally substituted one or more times by substituents selected independently from R$^2$.

In some such embodiments, R$^1$ is methyl, ethyl, propyl, isopropyl, butyl, sec-butyl, isobutyl, tert-butyl, pentyl, isoamyl, neopentyl, hexyl, octyl, or 2-ethylhexyl. In some further such embodiments, R$^1$ is methyl, ethyl, or isopropyl. In some even further such embodiments, R$^1$ is methyl.

In some embodiments, X$^1$ is —(CH$_2$)$_2$— or —(CH$_2$)$_9$—. In some further embodiments, X$^1$ is —(CH$_2$)$_7$—.

Non-limiting examples of α-ester-alk-ω-ene molecules include 9-decenoic acid methyl ester, 9-decenoic acid ethyl ester, 9-decenoic acid propyl ester, 9-decenoic acid butyl ester, 9-decenoic acid pentyl ester, 10-undecenoic acid methyl ester, 10-undecenoic acid ethyl ester, 10-undecenoic acid propyl ester, 11-dodecenoic acid methyl ester, 11-dodecenoic acid ethyl ester, and 11-dodecenoic acid propyl ester.

As noted below, the copolymers disclosed herein can include repeating units that are formed from an alpha-olefin. The alpha-olefin may be represented by the structure H$_2$C=C(R$^c$)(R$^d$), where R$^c$ is a first hydrocarbon group, and R$^d$ is either hydrogen or a second hydrocarbon group. When R$^c$ and R$^d$ are each a hydrocarbon group, R$^c$ and R$^d$ may be the same or they may be different. If R$^c$ and/or R$^d$ include 3 or more carbon atoms, R$^c$ and R$^d$ independently may include a straight chain of the carbon atoms or may include a branched chain. In some embodiments, the alpha-olefin monomer is a terminal alkene having from 8 to 18 carbon atoms.

Examples of alpha-olefin monomers, include but are not limited to linear alpha-olefins such as propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Examples of mono-substituted alpha-olefin monomers include but are not limited to branched alpha-olefins such as substituted derivatives of 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene or 1-eicosene, isobutylene, 2-methylbut-1-ene, 2-methylpent-1-ene, 2-methylhex-1-ene, 2-methylhept-1-ene, 2-methyloct-1-ene, and the like; 2-ethylbut-1-ene, 2-ethylpent-1-ene, 2-ethylhex-1-ene, 2-ethylhept-1-ene, 2-ethyloct-1-ene, and the like; 2-propylpent-1-ene, 2-propylhex-1-ene, 2-propylhept-1-ene, 2-propyloct-1-ene, and the like; and 2-butylhex-1-ene, 2-butylhept-1-ene, 2-butyloct-1-ene, and the like.

In some instances, these compounds can be generated via the metathesis of a natural oil. In an some embodiments, a composition including 1-decene, which is an alpha-olefin, can be prepared by the cross-metathesis of ethylene, 1-propene, 1-butene, and the like with a natural oil, a natural oil derivative and/or a metathesized natural oil containing unsaturated polyol esters. For example, oleic acid and/or methyl oleate may undergo cross-metathesis with the terminal alkene to provide a composition including 1-decene. Due to the stoichiometry of the cross-metathesis reaction, the product composition can include amounts of other alpha-olefins. For example, when propylene is used in the cross-metathesis with an oleate, 2-undecene is also formed. And when 1-butene is used, 3-dodecene is also formed.

Alpha-Olefin Copolymers

In at least one aspect, the disclosure provides compositions, comprising: a copolymer comprising constitutional units formed from two or more monomers, the two or more monomers comprising a first monomer, which is an alpha-olefin, and a second monomer, which is an ester alkene molecule, such as an α-ester-alk-ω-ene molecule.

The disclosed compositions comprise copolymers comprising constitutional units formed from two or more monomers. The disclosed copolymers are not limited to any particular arrangement of constitutional units. For example, in some embodiments, the two or more monomers are arranged in a regular pattern, such as ABABABAB, AABAABAAB, AAABAAABAAAB, and the like. In some other embodiments, however, the two or more monomers are arranged in random or semi-random fashion. Or, in some other embodiments, the monomers are arranged in blocks, such as AAAAAAAABBBBAAAAAAABBBBBB, and the like.

The alpha-olefin is an alpha-olefin according to any of the embodiments described above. In some embodiments, the alpha-olefin has from 8 to 18 carbon atoms. In some such embodiments, the alpha-olefin is a C$_{8-18}$terminal alkene, or a C$_{9-18}$terminal alkene, or a C$_{10-18}$ terminal alkene, or a C$_{11-18}$ terminal alkene, or a C$_{12-18}$ terminal alkene, or a C$_{8-16}$ terminal alkene, or a C$_{9-16}$ terminal alkene, or a C$_{10-16}$ terminal alkene, or a $C_{8-14}$ terminal alkene, or a $C_{9-14}$ terminal alkene, or a $C_{10-14}$ terminal alkene, or a $C_{10-12}$ terminal alkene. In some embodiments, the alpha-olefin is 1-octene, 1-nonen, 1-decene, 1-undecene, 1-dodecene, or any combination thereof. In some embodiments, the alpha-olefin is 1-decene or 1-dodecene or any combination thereof. In some embodiments, the alpha-olefin is 1-decene. In some embodiments, the alpha-olefin is 1-dodecene.

The alpha-olefins can be obtained from any suitable source. In some embodiments, the alpha-olefins, or a portion of the alpha-olefins, are derived from petroleum-based sources. For example, in some embodiments, at least 50 percent by weight, or at least 60 percent by weight, or at least 70 percent by weight, or at least 80 percent by weight, or at least 90 percent by weight, or at least 95 percent by weight, of the alpha-olefins are derived from petroleum-based sources, based on the total weight of alpha-olefin incorporated into the copolymer. In some other embodiments, however, the alpha-olefins, or a portion of the alpha-olefins, are derived from one or more renewable sources, such as via the metathesis of a natural oil or natural oil derivative (as described above), via fermentation of natural oils, via other modification of natural oils by biological organisms, or the like. For example, in some embodiments, at least 20 percent by weight, or at least 30 percent by weight, or at least 40 percent by weight, or at least 50 percent by weight, or at least 70 percent by weight, or at least 90 percent by weight, of the alpha-olefins are derived from renewable sources, based on the total weight of alpha-olefin incorporated into the copolymer.

In some embodiments, the ester-alkene is an ester-functionalized alkene, where the alkene has from 3 to 24 carbon atoms (not including the carbon atom in the carbonyl group of the ester). In some embodiments, the alkene is a straight-chain alkene. In some such embodiments, the alkene is an internal alkene (i.e., an alkene having an internal carbon-carbon double bond). Non-limiting examples of such compounds include 9-undecenoic acid alkyl ester, 9-dodecenoic acid alkyl ester, 9-octadecenedioic acid monoalkyl ester, 9-octadecenedioic acid dialkyl ester, and the like. In some such embodiments, the alkyl esters are methyl, ethyl, or isopropyl esters. In some embodiments, the alkene of the ester-alkene is a straight-chain alkene, which is a terminal alkene (i.e., an alkene having a terminal carbon-carbon double bond). In some embodiments, the alkene-ester molecule is an α-ester-alk-ω-ene molecule.

In some embodiments, the α-ester-alk-ω-ene molecule is an α-ester-alk-ω-ene molecule according to any of the embodiments described above. In some embodiments, the α-ester-alk-ω-ene molecule is a compound of formula (I):

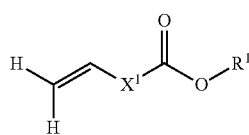

(I)

wherein
$R^1$ is $C_{1-12}$ alkyl, which is optionally substituted one or more times by substituents selected independently from $R^2$;
$R^2$ is halogen, —OH, $C_{1-6}$alkoxy, —NH$_2$, —NH($C_{1-6}$alkyl), —N($C_{1-6}$alkyl)$_2$, $C_{1-6}$ haloalkyl, or $C_{1-6}$ haloalkoxy; and $X^1$ is $C_{1-24}$alkylene or $C_{2-24}$alkenylene, each of which is optionally substituted one or more times by substituents selected independently from $R^2$.

In some such embodiments, $R^1$ is methyl, ethyl, propyl, isopropyl, butyl, sec-butyl, isobutyl, tert-butyl, pentyl, isoamyl, neopentyl, hexyl, octyl, or 2-ethylhexyl. In some further such embodiments, $R^1$ is methyl, ethyl, or isopropyl. In some even further such embodiments, $R^1$ is methyl.

In some embodiments, $X^1$ is —(CH$_2$)$_2$— or —(CH$_2$)$_9$—. In some further embodiments, $X^1$ is —(CH$_2$)$_7$—.

Non-limiting examples of α-ester-alk-ω-ene molecules include 9-decenoic acid methyl ester, 9-decenoic acid ethyl ester, 9-decenoic acid propyl ester, 9-decenoic acid butyl ester, 9-decenoic acid pentyl ester, 10-undecenoic acid methyl ester, 10-undecenoic acid ethyl ester, 10-undecenoic acid propyl ester, 11-dodecenoic acid methyl ester, 11-dodecenoic acid ethyl ester, and 11-dodecenoic acid propyl ester.

In some embodiments, the α-ester-alk-ω-ene molecule is 9-decenoic acid methyl ester, 9-decenoic acid ethyl ester, 9-decenoic acid isopropyl ester, or a combination thereof. In some further embodiments, the α-ester-alk-ω-ene molecule is 9-decenoic acid methyl ester.

The α-ester-alk-ω-ene molecules can be obtained from any suitable source. In some embodiments, the α-ester-alk-ω-ene molecules, or a portion of the α-ester-alk-ω-ene molecules, are derived from petroleum-based sources. For example, in some embodiments, at least 20 percent by weight, or at least 30 percent by weight, or at least 40 percent by weight, or at least 50 percent by weight, or at least 70 percent by weight, or at least 90 percent by weight, of the α-ester-alk-ω-ene molecules are derived from petroleum-based sources, based on the total weight of α-ester-alk-ω-ene molecules incorporated into the copolymer. In some other embodiments, however, the α-ester-alk-ω-ene molecules, or a portion of the α-ester-alk-ω-ene molecules, are derived from one or more renewable sources, such as via the metathesis of a natural oil or natural oil derivative (as described above), via fermentation of natural oils, via other modification of natural oils by biological organisms, or the like. For example, in some embodiments, at least 50 percent by weight, or at least 60 percent by weight, or at least 70 percent by weight, or at least 80 percent by weight, or at least 90 percent by weight, or at least 95 percent by weight, of the α-ester-alk-ω-ene molecules are derived from renewable sources, based on the total weight of α-ester-alk-ω-ene molecules incorporated into the copolymer.

In some embodiments, the copolymers disclosed herein can include constitutional units that, in addition to being formed from a first monomer and a second monomer, are also formed from a third monomer, a fourth monomer, a fifth monomer, etc. In some embodiments, however, at least 80 percent by weight, or at least 85 percent by weight, or at least 90 percent by weight, or at least 95 percent by weight of the constitutional units in the alpha-olefin copolymer are formed from the first and the second monomers. In some embodiments the constitutional units are formed from only the first monomer and the second monomer. These additional monomers may include any polymerizable substance that contains a carbon-carbon double bond. In some embodiments, one or more of these additional monomers have at least one unconjugated carbon-carbon double bond, such as a terminal carbon-carbon double bond. In some embodiments, the constitutional units of the copolymer are not formed from any monomers where the terminal carbon-carbon double bond is conjugated to a carbonyl group, such as acrylic acid and its esters, methacrylic acid and its esters, and the like. In some other embodiments, fewer that 5 percent by weight, or fewer than 3 percent by weight, or fewer than 2 percent by weight, or fewer than 1 percent by weight of the constitutional units in the alpha-olefin copolymer are formed from monomers having a terminal carbon-carbon double bond is conjugated to a carbonyl group.

Examples of such unsaturated polymerizable substances include the alpha-alkenols, alpha-alkenyl acetates, alpha-alkenyl halides (chlorides, bromides or iodides), allyl cyclohexane and allyl cyclopentane described above with regard to the monosubstituted compounds containing a terminal alkenyl group for cross-metathesis. In some embodiments, such unsaturated polymerizable substances include ethylene; styrenes such as styrene and methyl styrene; halogenated vinyl compounds such as vinyl chloride, vinylidene chloride and tetrafluoroethylene; acrylates; acrylamide; acrylonitrile; N-vinyl pyrrolidone; and substituted derivatives thereof. Examples of acrylate monomers include butyl acrylate, 2-ethylhexyl acrylate, ethyl acrylate, lauryl acrylate, hexadecyl acrylate, and methacrylate derivatives of these monomers. Examples of acrylamide monomers include acrylamide, N,N-dimethyl acrylamide, N-ethyl acrylamide, N-isopropyl acrylamide and hydroxymethyl acrylamide, and methacrylamide derivatives of these monomers.

In some embodiments, the copolymer comprises constitutional units formed from an alpha-olefin (as described above), an ester alkene molecule (e.g., an α-ester-alk-ω-ene molecule, as described above), and at least one other monomer, which, in some embodiments, is an α-(carboxylic acid)-alk-ω-ene molecule. In some embodiments, the α-(carboxylic acid)-alk-w-ene molecule has the chemical formula: HO—C(=O)—($R^e$)—CH=$CH_2$, where $R^e$ is $C_{2-20}$ alkyl. Examples of α-(carboxylic acid)-alk-ω-ene molecules include, but are not limited to, 9-decenoic acid, 10-undecenoic acid and 11-dodecenoic acid. An a-(carboxylic acid)-alk-ω-ene molecule may be formed by hydrolyzing or saponifying an α-ester-alk-ω-ene molecule.

The copolymer is formed, at least in part, by reacting the monomers in a reaction mixture. The reaction mixture includes the first monomer (alpha-olefin), the second monomer (α-ester-alk-ω-ene molecule), and optionally at least one other monomer (e.g., α-(carboxylic acid)-alk-ω-ene molecule). In some embodiments, the reaction mixture may include only these monomers. But in some other embodiments, it may include one or more other substances, such as a solvent, a buffer, a salt, and the like. Non-limiting examples of solvents include: protic solvents, such as water, methanol, ethanol, isopropyl alcohol (IPA) and butanol; and aprotic solvents, such as tetrahydrofuran (THF), dioxane, dimethyl formamide (DMF), toluene and xylene. In some embodiments, the solvent is substantially free of water, meaning that the solvent contains less than 5%, or less than 3%, or less than 1% of water by volume.

The polymerization reaction can occur by any suitable means, or any combination thereof. In some embodiments, the constitutional units of the copolymer are formed by addition polymerization. In some other embodiments, the constitutional units of the copolymer are formed by free radical polymerization. In some other embodiments, some constitutional units of the copolymer are formed by addition polymerization and other constitutional units of the copolymer are formed by free radical polymerization, or vice versa.

The reaction mixture can be formed by any suitable means. In some embodiments, forming the reaction mixture containing the first monomer, the second monomer, and optionally at least one other monomer includes combining the monomers with an addition polymerization initiator. Non-limiting examples of addition polymerization initiators include free radical polymerization initiators, cationic polymerization initiators and anionic polymerization initiators. A polymerization initiator is not required in the reaction mixture, however, as addition polymerization may be initiated by heat, by electromagnetic radiation, such as visible or ultraviolet light, or by other suitable means.

In some other embodiments, forming the reaction mixture containing the first monomer, the second monomer, and optionally at least one other monomer includes combining the monomers with a free radical addition polymerization initiator. Selection of a particular free radical polymerization initiator may depend on a number of factors including, but not limited to, the polymerization temperature, the type of comonomers, and whether a solvent is present in the reaction mixture. Non-limiting examples of free radical polymerization initiators include: peroxides, such as hydrogen peroxide; and various organic peroxides, including, but not limited to: alkyl peroxides, such as di-t-butyl peroxide, di-t-amyl peroxide, dilauroyl peroxide and 2,5-bis(t-butylperoxy)-2,5-dimethylhexane; acyl peroxides; aryl peroxides, such as benzoyl peroxide, dicumyl peroxide and t-butyl peroxybenzoate; and hydroperoxides, such as t-butyl hydroperoxide. Additional non-limiting examples of free radical polymerization initiators include: azo compounds, such as 2,2'-azobisisobutyro-nitrile (AIBN), 2,2'-azobis(2-methylbutyronitrile), 2,2'-azobis(2,4-dimethylvaleronitrile), 2,2'-azobis(2-amidino -propane)-dihydrochloride, and 2,2'-azobis(N,N'-dimethylene-isobutyl-amidine). Additional non-limiting examples of free radical polymerization initiators include: persulfates, such as potassium persulfate and ammonium persulfate. Other non-limiting examples of free radical polymerization initiators include hydroperoxides, peresters, and photoinitiators. Various combinations of free radical polymerization initiators can be employed as well, as long as they are suitable for use in combination with each other.

When present, the amount of polymerization initiator may range, for example, from 0.01 to 25 mol %, or from 1 to 20 mol %, or from 2 to 18 mol %, or from 3 to 15 mol %, or from 2 to 10 mol %, or from 7 to 18 mol %, or from 10 to 15 mol %, based on the total moles of comonomers present.

In some embodiments where free radical polymerization is employed, the reaction mixture can also include a chain transfer agent. Any suitable chain transfer agent can be used, according to the knowledge of those skilled in the art. In some embodiments, the chain transfer agent is a terminal alkene having 2 to 20 carbon atoms, or 2 to 16 carbon atoms, or 2 to 12 carbon atoms, or 2 to 10 carbon atoms, or 2 to 8 carbon atoms, or 2 to 6 carbon atoms. In some embodiments, the chain transfer agent is an alpha-olefin having at least one fewer carbon atom(s) than the first monomer in the copolymer. In some other embodiments, the chain transfer agent is a thiol compound, such as an alkyl thiol, including, but not limited to, stearyl thiol, dodecyl thiol, octyl thiol, tert-nonyl thiol, and the like. In some other embodiments, the chain transfer agent is a halide, such as an alkyl halide, including, but not limited to, bromotrichloromethane, octyl bromide, tert-amyl bromide, and the like. In some other embodiments, the chain transfer agent is an alcohol, such as an alkyl hydroxide, including, but not limited to, octyl alcohol, tert-amyl alcohol, and the like. In some other embodiments, the chain transfer agent is a cyclic unsaturated hydrocarbon, such as cyclohexadiene, terpinolene, γ-terpinene, and the like. The chain transfer agent can be used in any suitable amount, for example, up to 20 mol %, or up to 10 mol %, or up to 5 mol %, based on the total moles of monomers in the copolymer.

In some embodiments, forming a product mixture containing the copolymer having constitutional units formed from the first monomer, the second monomer, and optionally other monomers, includes heating the reaction mixture. The reaction mixture may be heated to a temperature of at least about 30° C., including but not limited to a temperature from about 30° C. to about 250° C., from about 40° C. to about 200° C., from about 50° C. to about 175° C., or from about 60° C. to about 160° C. The reaction mixture may be heated for at least about 1 hour, including but not limited to from about 1 hour to about 100 hours, from about 5 hours to about 50 hours, from about 10 hours to about 30 hours, or from about 15 hours to about 25 hours.

In some embodiments, forming a product mixture containing the copolymer having constitutional units formed from the first monomer, the second monomer, and optionally other monomers, includes isolating the copolymer. In some such embodiments, isolating the copolymer may include removing volatile starting material and/or byproducts under reduced pressure and/or heat. In some such embodiments, isolating the copolymer may include dissolving the copolymer in a solvent to form a solution, and precipitating the copolymer by contacting the solution with a non-solvent for the copolymer. In some such embodiments, isolating the copolymer may include dissolving the copolymer in a solvent to form a solution, and removing low molecular weight species from the solution by dialysis against the solvent. Other isolation techniques can also be used.

The copolymers disclosed herein need not be formed in any particular yield. In some embodiments, however, the yield of the copolymer is at least 25%, or at least 40%, or at least 50%, or at least 60%, or at least 70%, or at least 80%, or at least 90%, or at least 95%.

Figure 2:
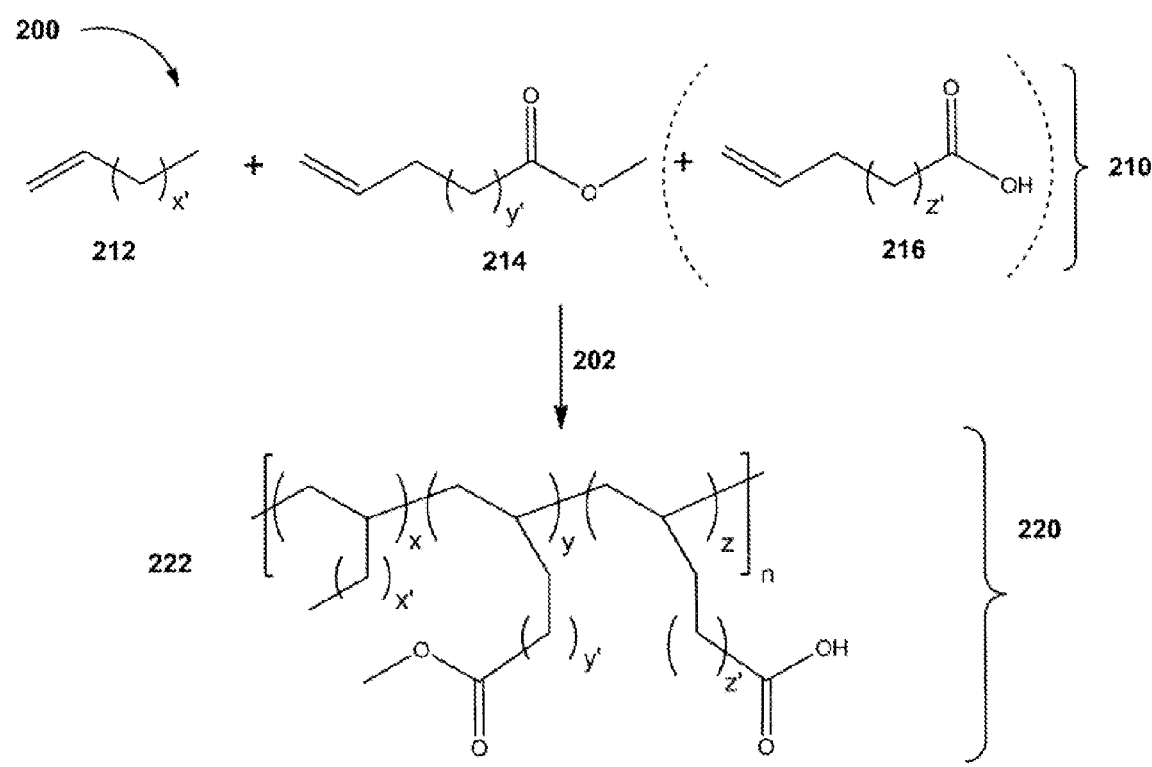
FIG. 2 depicts chemical structures and a reaction scheme for an example of a method of forming a copolymer composition according to one or more of the disclosed embodiments.

FIG. 2 depicts chemical structures and a reaction scheme for an example of a method 200 of forming a copolymer according to any of the disclosed embodiments. The method 200 includes forming a reaction mixture 210 containing a first monomer 212 that is an alpha-olefin, a second monomer 214 that is an α-ester-alk-ω-ene molecule, and optionally at least one other monomer, such as a α-(carboxylic acid)-alk-ω-ene molecule 216. The method 200 further includes forming a product mixture 220 containing a copolymer 222 formed from the monomers 212, 214 and optionally 216. In the alpha-olefin monomer 212 and in copolymer 222, x' may be an integer from 0 to 20. In the α-ester-alk-ω-ene monomer 214 and in copolymer 222, y' may be an integer from 1 to 19. In the optional α-(carboxylic acid)-alk-ω-ene monomer 216 and in copolymer 222, z' may be an integer from 1 to 19. In the copolymer 222, x+y+z=1, where x may be from 0.01 to 0.99, y may be from 0.01 to 0.99, and z may be from 0 to 0.98. For example, x may be from 0.5 to 0.9, y may be from 0.1 to 0.5, and z may be from 0 to 0.4. Preferably x is from 0.65 to 0.9, y is from 0.1 to 0.35, and z is from 0 to 0.25. Preferably the ratio of x to y is at least 2:1, and preferably the ratio of x to (y+z) is at least 2:1. In the copolymer 222, n may be from 2 to 100, from 3 to 50, or from 4 to 25.

In one example, the alpha-olefin monomer 212 is 1-octene (x'=5), 1-decene (x'=7), 1-dodecene (x'=9) or the like, or combinations thereof; and the α-ester-alk-ω-ene molecule 214 is 9-decenoic acid methyl ester (9-DAME) (y'=6). In another example, the alpha-olefin monomer 212 is 1-octene (x'=5), 1-decene (x'=7), 1-dodecene (x'=9) or the like, or combinations thereof; the α-ester-alk-ω-ene molecule 214 is 9-DAME (y'=6) or the like, and the α-(carboxylic acid)-alk-ω-ene monomer 216 is 9-decenoic acid (z'=6) or the like. The copolymer 222 formed from these three monomers (212, 214 and 216) also may be formed by polymerizing only monomers 212 and 214, and then partially hydrolyzing the methyl ester groups of the constitutional units formed from the α-ester-alk-ω-ene monomer 214.

The copolymer can include any suitable ratio of the first monomer (alpha-olefin) to the second monomer (the α-ester-alk-ω-ene molecule). In some embodiments, the mole-to-mole ratio of the first monomer to the second monomer is from 0.1:99.9 to 99.9:0.1, or 1:99 to 99:1, or from 1:3 to 25:1, or from 1:2 to 15:1, or from 1:2 to 2:1, or from 2:1 to 5:1, or from 5:1 to 15:1.

In embodiments where a third monomer (e.g., the α-(carboxylic acid)-alk-ω-ene) is used to form the copolymer, the third monomer can be present in any suitable amount. In some embodiments, the mole-to-mole ratio of the second monomer to the third monomer is 0.1:99.9 to 99.9:0.1, or 1:99 to 99:1, or from 1:3 to 25:1, or from 1:2 to 15:1, or from 1:2 to 2:1, or from 2:1 to 5:1, or from 5:1 to 15:1.

In some embodiments, the composition has a high kinematic viscosity, e.g., at 100° C. In some such embodiments, the composition has a kinematic viscosity at 100° C. of 25 to 200 centistokes. In some other embodiments, the composition has a kinematic viscosity at 100° C. of 25 to 150 centistokes. In some other embodiments, the composition has a kinematic viscosity at 100° C. of 30 to 150 centistokes, or 35 to 150 centistokes, or 25 to 100 centistokes, or 30 to 100 centistokes, or 35 to 100 centistokes, or 40 to 80 centistokes, or 25 to 60 centistokes, or 30 to 60 centistokes, or 35 to 60 centistokes, or 25 to 50 centistokes, or 30 to 50 centistokes, or 35 to 50 centistokes, or 35 to 45 centistokes, or 38 to 42 centistokes. In some embodiments, the composition has a kinematic viscosity at 100° C. of 30 to 44 centistokes, or 32 to 42 centistokes, or 34 to 42 centistokes, or 34 to 40 centistokes. In some other embodiments, the composition has a kinematic viscosity at 100° C. of 75 to 125 centistokes, or 80 to 120 centistokes, or 90 to 110 centistokes, or 95 to 105 centistokes.

In some such embodiments, the composition does not become too viscous at lower temperatures, e.g., at around −26° C. For example, in some embodiments, the composition has a Brookfield viscosity at −26° C. of no more than 110,000 cP, or no more than 105,000 cP, or no more than 100,000 cP, or no more than 95,000 cP, or no more than 90,000 cP, or no more than 85,000 cP, or of no more than 80,000 cP, or of no more than 75,000 cP. In some embodiments, the composition has a Brookfield viscosity at −26° C. of 20,000 to 100,000 cP, or of 30,000 cP to 95,000 cP, or of 35,000 cP to 95,000 cP.

In some embodiments, the composition shows an improved viscosity index relative to other base oils. For example, in some embodiments, the composition has a viscosity index of at least 150, or at least 152, or at least 154, or at least 156, or at least 158, or at least 160. In some such embodiments, the composition has a viscosity index of 150 to 170, or 150 to 165, or 155 to 165.

In addition to demonstrating beneficial viscosity characteristics, the composition, in certain embodiments, demonstrates desirable polarity. The improved polarity, in some instances, can at least partially obviate the need to blend the composition with an ester-based additive in certain lubricant applications. In such instances, this can permit the concurrent maintenance of desirable viscosity features and desirable polarity features, as ester-based additives can often cause the blended composition to have a lower viscosity and a lowered viscosity index. For example, in some embodiments, the composition has an aniline point of no more than 120° C., or no more than 118° C., or no more than 116° C., or no more than 114° C., or no more than 112° C., or no more than 110° C., or no more than 108° C., or no more than 106° C., or no more than 104° C., or no more than 102° C. In some such embodiments, the composition has an aniline point of 95 to 118° C., or 97 to 115° C. In some embodiments, the composition has an aniline point of no more than 25° C., or no more than 35° C., or no more than 50° C., or no more than 70° C., or no more than 90° C. In some embodiments, the composition has an aniline point of 0 to 120° C., or 20 to 118° C.

The alpha-olefin copolymers in the composition can have any suitable molecular weight. In some embodiments, the number-average molecular weight, $M_n$, of from 1900 to 3000 Da, or from 1950 to 3000 Da, or from 2000 to 3000 Da, or from 2050 to 3000 Da, or from 2100 to 3000 Da, or from 2000 to 2800 Da, or from 2000 to 2600 Da, or from 2000 to 2400 Da, or from 2050 to 2800 Da, or from 2050 to 2600 Da, or from 2050 to 2400 Da, or from 2100 to 2800 Da, or from 2100 to 2600 Da, or from 2100 to 2400 Da.

In some embodiments, the alpha-olefin copolymers in the composition can optionally be subjected to stripping, so as to reduce the number of lower molecular weight fragments, thereby increasing the number average molecular weight (and also the weight average molecular weight). The stripping can be carried out by any conventional means and at a suitable temperature. In some embodiments, the stripping is carried out at a temperature from 150 to 350° C., or from 150 to 325° C., or from 150 to 300° C., or from 175 to 325° C., or from 175 to 300° C., or from 200 to 325° C.

In some embodiments, the copolymer formed from the reaction mixture comprising the alpha-olefin copolymer and the ester-alkene molecule (e.g., the α-ester-alk-w-ene molecule) contains some amount of unsaturation, e.g., in the form of carbon-carbon double bonds. In some embodiments, the alpha-olefin copolymer is further partially hydrogenated to remove at least a portion of the unsaturation, resulting in a partially hydrogenated or hydrogenated alpha-olefin copolymer. In some embodiments, the alpha-olefin copolymer has an iodine value of no more than 25, or no more than 20, or no more than 15, or no more than 10, or no more than 5, or no more than 3, or no more than 1.

Lubricant Compositions, Methods of Making, and Methods of Use

The compositions comprising the alpha-olefin copolymer (according to any of the above embodiments) can be used as a lubricant composition or, in some other embodiments, in a lubricant composition. For example, in some embodiments, the disclosure provides a lubricant composition comprising an alpha-olefin copolymer composition (according to any of the above embodiments) and one or more additional materials.

The disclosed alpha-olefin copolymers can be included in a lubricant composition in any suitable combination. For example, in some embodiments, a lubricant composition can include two or more alpha-olefins formed from different proportions of alpha-olefin and the ester alkene (e.g., an α-ester-alk-ω-ene). In some embodiments, the composition comprises two or more different alpha-olefin copolymers, each having a mole-to-mole ratio of alpha-olefin to the α-ester-alk-ω-ene molecule of from 0.1:1 to 20:1. In some embodiments, the lubricant composition comprises two or more of the following: (a) an alpha-olefin copolymer formed from a reaction mixture having a mole-to-mole ratio of alpha-olefin to the α-ester-alk-ω-ene molecule of from 0.1:1 to 2.5:1; (b) an alpha-olefin copolymer formed from a reaction mixture having a mole-to-mole ratio of alpha-olefin to the α-ester-alk-ω-ene molecule of from 2.5:1 to 6:1; (c) an alpha-olefin copolymer formed from a reaction mixture having a mole-to-mole ratio of alpha-olefin to the α-ester-alk-ω-ene molecule of from 6:1 to 20:1. An alpha-olefin and an α-ester-alk-ω-ene molecule according to any of the above embodiments can be used. In some embodiments, the alpha-olefin is 1-decene, 1-dodecene, or a mixture thereof. In some such embodiments, the alpha-olefin is 1-decene. In some other such embodiments, the alpha-olefin is 1-dodecene. In some embodiments, the α-ester-alk-ω-ene molecule is an alkyl ester of 9-decenoic acid, an alkyl ester of 10-undecenoic acid, an alkyl ester of 11-dodecenoic acid, or a mixture thereof. In some such embodiments, the α-ester-alk-ω-ene molecule is an alkyl ester of 9-decenoic acid, such as a methyl ester, ethyl ester, isopropyl ester, and the like. In some other such embodiments, the α-ester-alk-ω-ene molecule is an alkyl ester of 10-undecenoic acid, such as a methyl ester, ethyl ester, isopropyl ester, and the like. In some other such embodiments, the α-ester-alk-ω-ene molecule is an alkyl ester of 11-dodecenoic acid, such as a methyl ester, ethyl ester, isopropyl ester, and the like.

FIG. 1 represents a method 100 of making a lubricant composition. The method 100 includes forming 101a reaction mixture 110 containing a first monomer 112 that is an alpha-olefin, a second monomer 114 that is an α-ester-alk-ω-ene molecule, and optionally at least one other monomer 116; forming 102 a product mixture 120 containing a copolymer 122 having constitutional units formed from the monomers 112, 114 and optionally 116; and optionally combining 103 the copolymer 122 with at least one other material 130.

Method 100 may produce a lubricant composition from renewable feedstocks, and may advantageously provide simpler and/or more cost-effective production, reduced variability, improved sourcing, and increased biorenewability than conventional methods for producing a lubricant composition from petrochemical feedstocks. In addition, lubricant compositions formed by method 100 may have useful combinations of properties, including but not limited to, high viscosity index, oxidative stability, thermal stability, and hydrolytic stability.

The one or more additional materials can be any materials suitable for inclusion in a lubricant composition. In some embodiments, one of the one or more additional materials is a diluent. Any suitable diluent can be used. In some embodiments, the diluent comprises a known lubricant base oil, including, but not limited to: mineral oil or another similar petroleum fraction. In some embodiments, the diluent comprises an API Group I base oil, an API Group II base oil, an API Group III base oil; an API Group IV base oil, such as a poly(alpha-olefin) (PAO); an API Group V base oil, such as an ester (e.g., a diester or polyester); or a mixture thereof. In some embodiments, the diluent is an API Group IV base oil, such as PAO. In some embodiments, the diluent is an API Group II base oil, an API Group III base oil, an API Group IV base oil, or a mixture thereof. In some such embodiments, the diluent is an API Group II base oil. In some other such embodiments, the diluent is an API Group III base oil. In some further such embodiments, the diluent is an API Group IV base oil.

In some instances, the alpha-olefin copolymer compositions disclosed herein may have a higher polarity than certain conventional base oils, such as PAO. Thus, use of the alpha-olefin copolymer compositions in a lubricant composition can at least partially obviate the need to include certain polar components in the composition. In some further embodiments, the lubricant composition comprises no more than 5 percent by weight, or no more than 4 percent by weight, or no more than 3 percent by weight, or no more than 2 percent by weight, or no more than 1 percent by weight of ester compounds (besides the alpha-olefin copolymer compositions).

In embodiments that include a diluent, the diluent can be added in any suitable amount. In some instances, the addition of a diluent can be referred to as "blending," where the diluent serves to adjust one or more properties of the lubricant composition to be suitable for certain desired uses. The amount of the blending can depend on a variety of factors, including, but not limited to, the properties of the alpha-olefin copolymer composition, the properties of the diluent or diluent mixture, the properties and quantities of any other additive to be included, the desired properties of the blend, and the like. In some embodiments, weight-to-weight ratio of the alpha-olefin copolymer to the diluent is from 1:99 to 99:1, or from 1:90 to 90:1, or from 1:50 to 50:1, or from 1:10 to 10:1, or from 1:5 to 5:1. In some embodiments, the lubricant comprises an amount of diluent sufficient to reduce the viscosity of the lubricant composition. For example, in some embodiments where the alpha-olefin copolymer composition has a kinematic viscosity at 100° C. of 34 to 100 centistokes (or has a kinematic viscosity at 100° C. of 34 to 42 centistokes), the lubricant composition further comprises an amount of diluent to adjust the kinematic viscosity of the lubricant composition at 100° C. to 27 to 32 centistokes, or to 23 to 27 centistokes, or to 17 to 21 centistokes, or to 14 to 17 centistokes, or to 9 to 13 centistokes, or to 5 to 10 centistokes, or to 7 to 9 centistokes, or to 5 to 7 centistokes.

In some embodiments, lubricant compositions comprising the alpha olefin copolymer and a diluent can have kinematic viscosities that conform to certain SAE (Society for Automotive Engineers) J 300 grades. In some embodiments, these lubricant compositions can be suitable for use as a passenger car motor oil (PCMO).

In some embodiments, the lubricant composition has an SAE J 300 viscosity grade of 5W and comprises an alpha olefin copolymer (according to any of the above embodiments) and a diluent. In some such embodiments, the lubricant composition is a 5W-30 passenger car motor oil. In some other such embodiments, the lubricant composition is a 5 W-40 heavy duty diesel oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the lubricant composition has an SAE J 300 viscosity grade of 10 W and comprises an alpha olefin copolymer (according to any of the above embodiments) and a diluent. In some such embodiments, the lubricant composition is a 10W-30 passenger car motor oil. In some other such embodiments, the lubricant composition is a 10W-40 heavy duty diesel oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the lubricant composition has an SAE J 300 viscosity grade of 15W and comprises an alpha olefin copolymer (according to any of the above embodiments) and a diluent. In some such embodiments, the lubricant composition is a 15W-40 heavy duty diesel oil (HDDO). In some other such embodiments, the lubricant composition is a 15W-50 heavy duty diesel oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the lubricant composition has an SAE J 306 viscosity grade of 75W and comprises an alpha olefin copolymer (according to any of the above embodiments) and a diluent. In some such embodiments, the lubricant composition is a 75W-90 gear oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the lubricant composition has an SAE J 306 viscosity grade of 80W and comprises an alpha olefin copolymer (according to any of the above embodiments) and a diluent. In some such embodiments, the lubricant composition is an 80W-90 gear oil. In some other such embodiments, the lubricant composition is an 80W-140 gear oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the lubricant composition has an SAE J 306 viscosity grade of 85W and comprises an alpha olefin copolymer (according to any of the above embodiments) and a diluent. In some such embodiments, the lubricant composition is an 85W-90 gear oil. In some other such embodiments, the lubricant composition is an 85W-140 gear oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some other embodiments, the lubricant composition has a viscosity consistent with certain ISO viscosity grades (by the International Organization for Standardization). For example, in some embodiments, the lubricant composition has an ISO viscosity grade of 46, or an ISO viscosity grade of 68, or an ISO viscosity grade of 100, or an ISO viscosity grade of 150, or an ISO viscosity grade of 220, or an ISO viscosity grade of 320, or an ISO viscosity grade of 460, or an ISO viscosity grade of 680, and comprises an alpha olefin copolymer (according to any of the above embodiments) and a diluent. In some such embodiments, the lubricant composition is an 85W-90 gear oil. In some other such embodiments, the lubricant composition is an 85W-140 gear oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some other embodiments, the lubricant composition has a viscosity consistent with certain AGMA (Regular) viscosity grades (by the American Gear Manufacturers Assoc.). For example, in some embodiments, the lubricant composition has an AGMA (Regular) viscosity grade of 1, or an AGMA (Regular) viscosity grade of 2, or an AGMA (Regular) viscosity grade of 3, or an AGMA (Regular) viscosity grade of 4, or an AGMA (Regular) viscosity grade of 5, or an AGMA (Regular) viscosity grade of 6, or an AGMA (Regular) viscosity grade of 7, or an AGMA (Regular) viscosity grade of 8, and comprises an alpha olefin copolymer (according to any of the above embodiments) and a diluent. In some such embodiments, the lubricant composition is an 85W-90 gear oil. In some other such embodiments, the lubricant composition is an 85W-140 gear oil. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In the above lubricant compositions, any suitable amount of the alpha-olefin copolymer and the diluent can be used, so as to make a lubricant composition having viscosity characteristics consistent with the respective SAE grades. In some embodiments, the lubricant is a passenger car motor oil (PCMO), where the lubricant composition comprises 30 to 70 percent by weight, or 35 to 65 percent by weight, or 40 to 60 percent by weight of the alpha-olefin copolymer. In some other embodiments, the lubricant is a heavy duty diesel oil (HDDO), where the lubricant composition comprises 30 to 95 percent by weight, or 35 to 90 percent by weight, or 40 to 85 percent by weight of the alpha-olefin copolymer. In some embodiments, the lubricant is gear oil, where the lubricant composition comprises 40 to 85 percent by weight, or 45 to 80 percent by weight, or 50 to 75 percent by weight, or 70 to 99 percent by weight, 75 to 95 percent by weight, or 80 to 85 percent by weight of the alpha-olefin copolymer. In some embodiments, the lubricant is an industrial oil, where the lubricant composition comprises 35 to 99 percent by weight, or 40 to 99 percent by weight of the alpha-olefin copolymer.

As noted above, the alpha-olefin copolymers disclosed herein can have improved viscosity characteristics relative to other base oils, such as lower-viscosity base oils. Therefore, in some embodiments, the alpha-olefin copolymers can be blended with a diluent (e.g., a lower-viscosity base oil, such as an API Group II base oil or an API Group III base oil) to improve the viscometrics of the diluent and/or to achieve a desired viscosity target (e.g., multi-grade high and low viscosity targets). Thus, in certain aspects, the disclosure provides methods for increasing the viscoelasticity of a base oil, the methods comprising: providing a base oil; blending an alpha-olefin copolymer composition (according to any of the embodiments described above) with the base oil. In some embodiments, the base oil is an API Group I base oil, an API Group II base oil, an API Group III base oil, an API Group IV base oil, or a mixture thereof. In some embodiments, the base oil is an API Group II base oil, an API Group III base oil, an API Group IV base oil, or a mixture thereof. In some such embodiments, the alpha-olefin copolymer composition includes a copolymer formed from a reaction mixture comprising: (a) 1-decene, 1-dodecene, or a mixture thereof; and (b) an alkyl ester of 9-denenoic acid (e.g., methyl, ethyl, or isopropyl esters, or mixtures thereof). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1.

In some embodiments, the one or more additional materials can include one or more additives, such as those typically used in lubricant compositions. Such additives include, but are not limited to, dispersants, detergents, antiwear agents, antioxidants, metal deactivators, extreme pressure (EP) additives, viscosity modifiers such as viscosity index improvers, pour point depressants, corrosion inhibitors, friction coefficient modifiers, colorants, antifoam agents, antimisting agents, demulsifiers, organomolybdenum compounds, and zinc dialkyl dithiophosphates. In some embodiments, for example, where the lubricant composition is blended to be suitable for use as a gear oil, the lubricant composition comprises a standard additive package, such as an additive package for a GL-4 or GL-5 gear oil.

The one or more additives can be used in any suitable amount in the lubricant composition. The quantity and combination of additives used can depend on a variety of factors, including, but not limited to, the properties of the base oil, the properties of the selected additives, and the desired properties of the resulting composition. In some embodiments, the one or more additives make up from 0.1 to 50 weight percent, or from 0.1 to 40 weight percent, or from 0.1 to 30 weight percent, or from 0.1 to 20 weight percent, or from 0.1 to 15 weight percent.

In some instances, the alpha-olefin copolymer compositions disclosed herein have improved viscosity properties (e.g., viscosity index) relative to certain conventional base oils, such as API Group II or Group III base oils. Thus, in some embodiments, use of the alpha-olefin copolymer compositions can at least partially obviate the need to include one or more viscosity modifiers in a lubricant composition. Therefore, in some embodiments, the lubricant composition is substantially free of a viscosity modifier. For example, in some embodiments, the lubricant composition comprises no more than 5 percent by weight, or no more than 3 percent by weight, or no more than 1 percent by weight, or no more than 0.5 percent by weight, or no more than 0.3 percent by weight, or no more than 0.1 percent by weight of a viscosity modifier, based on the total weight of the lubricant composition.

In some instances, the alpha-olefin copolymer compositions have improved low-temperature properties relative to certain conventional base oils, such as API Group II or Group III base oils. Thus, in some embodiments, use of the alpha-olefin copolymer compositions can at least partially obviate the need to include one or more pour point depressants in a lubricant composition. Therefore, in some embodiments, the lubricant composition is substantially free of a pour point depressant. For example, in some embodiments, the lubricant composition comprises no more than 5 percent by weight, or no more than 3 percent by weight, or no more than 1 percent by weight, or no more than 0.5 percent by weight, or no more than 0.3 percent by weight, or no more than 0.1 percent by weight, of a pour point depressant, based on the total weight of the lubricant composition.

Method 100 may provide a high-viscosity lubricant composition having a kinematic viscosity at 100° C. of at least 25 cSt, or at least 30 cSt, or at least 35 cSt, or at least 40 CSt. For example, the first monomer 112 may be a first alpha-olefin having from 8 to 18 carbon atoms such as 1-decene or 1-dodecene, and the second monomer 114 may be an α-ester-alk-ω-ene molecule such as 9-DAME. The reaction mixture 110 further may include an organic peroxide (e.g., di-tert-butyl peroxide or di-tert-amyl peroxide) as a polymerization initiator. The method 100 may further include subjecting the copolymer compositions to a first stripping at a temperature of at least 200° C., under a vacuum of from 0.5 to 1 torr, and then subjecting the copolymer composition to a second stripping at a temperature of at least 200° C., under a vacuum of from 0.1 to 1 torr. The method 100 may further include forming a second reaction mixture including the copolymer and organic peroxide, and forming a second product mixture containing a second copolymer. This second copolymer preferably has constitutional units formed from the first and second monomers, and has a weight average molecular weight that is at least twice that of the original copolymer.

The lubricant compositions disclosed herein can be employed in a variety of contexts. Non-limiting examples include, but are not limited to, motor oils, transmission fluids, gear oils, industrial lubricating oils, metalworking oils, hydraulic fluids, drilling fluids, greases, compressor oils, cutting fluids and milling fluids. In some embodiments, the lubricant compositions can be used for lubricating an internal combustion engine, a diesel engine, a two-cycle engine, a crankcase, a gearbox, one or more bearings, or a transmission.

Thus, in certain aspects, the disclosure provides methods of lubricating various mechanical systems, the methods comprising supplying to the mechanical system a lubricant composition comprising an alpha-olefin copolymer compositions according to any of the above embodiments.

In some embodiments, the disclosure provides methods of lubricating a transmission, a differential, or a transfer case, the method comprising supplying to a transmission, a differential, or a transfer case a lubricant composition comprising an alpha-olefin copolymer compositions according to any of the above embodiments. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. In some embodiments, the lubricant composition comprises a diluent. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the disclosure provides methods of lubricating an internal combustion engine, the method comprising supplying to an internal combustion engine a lubricant composition comprising an alpha-olefin copolymer compositions according to any of the above embodiments. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. In some embodiments, the lubricant composition comprises a diluent. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

In some embodiments, the disclosure provides methods of lubricating a diesel engine, the method comprising supplying to a diesel engine a lubricant composition comprising an alpha-olefin copolymer composition according to any of the above embodiments. In some such embodiments, the alpha-olefin copolymer is a copolymer formed from a reaction mixture comprising: (a) 1-decene, 1-dodecene, or a mixture thereof; and (b) an alkyl ester of 9-denenoic acid (e.g., methyl, ethyl, or isopropyl esters). In some such embodiments, the alpha-olefin copolymer is a copolymer formed from a reaction mixture comprising 1-dodecene and 9-denenoic acid methyl ester. In some such embodiments, the mole-to-mole ratio of the 1-dodecene to the 9-deneoic acid methyl ester is 1:2 to 2:1, or 2:1 to 6:1, or 6:1 to 15:1. In some embodiments, the lubricant composition comprises a diluent. Any suitable diluent or combinations of diluents can be used, including, but not limited to, API Group I base oils, API Group II base oils, API Group III base oils, API Group IV base oils, or any mixtures thereof. In some such embodiments, the diluent is an API Group II base oil. In some other embodiments, the diluent is an API Group III base oil. In some other embodiments, the diluent is an API Group IV base oil.

Such compositions are not necessarily limited to lubricating applications, however, and may find use in a variety of other contexts. For example, the alpha-olefin copolymers compositions disclosed herein can be used in various personal care products, including creams, ointments, emulsions, and the like.

Derivatives of Alpha-Olefin Copolymers

In at least one aspect, the disclosure provides compositions, comprising: a copolymer comprising constitutional units formed from two or more monomers, the two or more monomers comprising a first monomer, which is an alpha-olefin, and a second monomer, which is an ester-alkene molecule (e.g., an α-ester-alk-ω-ene molecule), where at least a portion of the ester groups of the ester-alkene molecules are chemically converted to another functional group. This can be carried out in any suitable manner. In some embodiments, the reactions are carried out prior to polymerization, such that at least a fraction of the α-ester-alk-ω-ene molecules are converted to alk-ω-ene compounds having a different functional group in the alpha position. In this sense, the chemically converted α-ester-alk-ω-ene molecules are a third monomer that can be reacted with the first monomer (alpha-olefins) and the second monomer (α-ester-alk-ω-ene molecules) to form a copolymer. In some other embodiments, the ester groups are chemically converted after polymerization.

In some such embodiments, all or substantially all (99% or more) of the ester groups in the copolymer are chemically converted to another functional group. In some other embodiments, only a fraction of the ester groups are converted. For example, in some embodiments, 1% to 99%, or 1% to 90%, or 1% to 80%, or 1% to 70%, or 1% to 60%, or 1% to 50%, or 1% to 40%, or 1% to 30%, or 1% to 20%, or 1% to 10%, or 90% to 99%, or 80% to 99%, or 70% to 99%, or 60% to 99%, or 50% to 99%, or 40% to 99%, or 30% to 99%, or 20% to 99%, or 10% to 99%, or 40% to 60%, or 30% to 70%, or 20% to 80%, or 10% to 90%.

Any suitable chemical conversions can be employed. Non-limiting examples of new functional groups that can be formed include: carboxylic acid groups (as described above); carboxylate salt groups, including, for example, salts of lithium, sodium, calcium, potassium, or magnesium; hydroxyl groups; thiol groups; halogen groups; amino groups, including primary amines and secondary and tertiary amines having other organic groups attached thereto; amides including amides of primary amines and secondary and tertiary amines having other organic groups attached thereto; ether groups or thioether groups having other organic groups attached thereto; aldehyde groups; acyl halide groups; ketones having other organic groups attached thereto; carbonates having other organic groups attached thereto; nitrile groups; isocyanate groups; imines having other organic groups attached thereto; disulfides having other organic groups attached thereto; sulfoxides having other organic groups attached thereto; sulfones having other organic groups attached thereto; sulfinic acid groups; sulfonic acid groups; isothiocyanate groups; and any combinations thereof.

In some other embodiments, the chemical transformations can include transesterification, where at least a fraction of the ester functional groups are converted from one ester to another ester. In some such embodiments, at least a fraction of the ester groups are converted to ester groups of a longer-chain alcohol. For example, a fraction of shorter-chain esters (e.g., methyl esters, ethyl esters, isopropyl esters, and the like) are transesterified to longer-chain esters (e.g., pentyl esters, isoamyl esters, neopentyl esters, hexyl esters, octyl esters, 2-ethylhexyl esters, and the like). In some embodiments, the transesterification can be carried out using alcohols containing ether linkages, such as methyl diglycol, methyl triglycol, and the like. In some embodiments, at least a fraction of esters of monohydric alcohols can be converted to esters of polyhydric alcohols (e.g., diols, such as neopentyl glycol and the like; triols, such as glycerol, 1,1,1-tris(hydroxylmethyl)propane, and the like; and higher-order polyols, such as erythritol, pentaerythritol, dipentaerythritol, xylitol, and the like). In some embodiments, the transesterification is conducted after the polymerization. In some other embodiments, however, the ester-alkene monomers are transesterified prior to polymerization.

In some embodiments, the chemical transformations can include converting at least a portion of the alkyl ester groups of the copolymer to hydroxyl groups, e.g., by reacting the ester with hydrogen has in the presence of heat and/or a catalyst. In this manner, one can synthesize a polyol which may be useful in various contexts, such as a food additive, as a soft segment of a polyurethane, etc.

In some other embodiments, the chemical transformations can include the addition of moieties that can impart certain desired properties to the resulting composition. Such moieties include, but are not limited to, oxidation-inhibiting moieties, dispersancy-imparting moieties, and detergency-imparting moieties. For example, in some embodiments, the chemical transformations include adding a hindered phenol moiety, a diarylamine moiety, or a combination thereof. In some other embodiments, the chemical transformations include adding a polyalkylenepolyamine moiety, e.g., to impart greater dispersancy. In some other embodiments, the chemical transformations include adding an alkali or alkaline earth-metal salt, e.g., to impart greater detergency.

In some embodiments, the chemical transformations can include the addition of moieties that bridge to other polymer chains or other parts of the same polymer chain. Any suitable cross-linker can be used. In some embodiments, the chemical transformations includes adding a polyalkylenepolyamine at the ester group of two separate constitutional units (either within the same polymer chain or within separate polymer chains). In some embodiments, the polyalkylenepolyamine is triethylenetetraamine. In some such embodiments, the polyalkylene-polyamine has a molecular weight of 50 to 1000 g/mol, or 100 to 500 g/mol.

As noted above, carbon-carbon double bonds can remain in the copolymer after polymerization. Therefore, in some embodiments, the alpha-olefin copolymers can be further functionalized by adding certain groups at these carbon-carbon double bonds, e.g., via an ene reaction. Any suitable moiety can be added, so long as it can be added via a reaction with an olefinic bond. In embodiments where the functionalization occurs via an ene reaction, any suitable enophile can be used, including, but not limited to alkenes, acetylenes, benzynes, and compounds having double bonds between carbon and a hetero atom, such as carbonyl groups, thiocarbonyl groups, and the like. In some embodiments, the enophile is maleic anhydride or esters thereof. Any suitable fraction of the carbon-carbon double bonds in the alpha-olefin copolymer can be functionalized. For example, in some embodiments, no more than 10%, or no more than 25%, or no more than 50%, or no more than 75%, or no more than 99%, or 100% of the carbon-carbon double bonds in the alpha-olefin copolymer are functionalized, e.g., via an ene reaction, based on the total number of carbon-carbon double bonds in the alpha-olefin copolymer prior to the functionalization. In embodiments, where the enophile is an acid group or an acid anhydride, such as maleic anhydride, the acid or anhydride functional group can be further reacted with any suitable groups to form an additional functional group. For example, in some embodiments, the acid or anhydride can be reacted with an alcohol to form one or more ester groups. In some other embodiments, the acid or anhydride can be reacted with an amine to form one or more amide groups.

EXAMPLES

The following examples are provided to illustrate one or more preferred embodiments of the invention. Numerous variations can be made to the following examples that lie within the scope of the invention.

Materials & Methods

Percent incorporation of comonomers was estimated using proton nuclear magnetic resonance spectrometry ($^1$H-NMR). Residual monomer was quantified with gas chromatography (GC), using a DB-5HT capillary column (J&W Scientific) and a flame ionization detector. The GC measurements also provided qualitative analysis of residual dimer, trimer and tetramer. Residual monomer, as well as reaction by-products, were separated and quantified with high performance liquid chromatography (HPLC), using an Agilent Zorbax Eclipse Plus C18 column and either a refractive index detector or a UV-visible detector.

Molecular weights of polymers were measured using gel permeation chromatography (GPC), using tetrahydrofuran (THF) as the mobile phase. The columns used in the GPC analysis were a guard column (VARIAN PLgel 5 μm guard column), a first separation column (200-400,000 daltons; VARIAN PLgel 5 μm MIXED-D), and a second separation column (<30,000 daltons; VARIAN PLgel 3 μm MIXED-E).

Kinematic viscosity was measured at 40° C. and/or at 100° C. using temperature controlled oil baths. As Brookfield dynamic viscosity scaled with the kinematic viscosity for some of the copolymers, kinetic viscosities for some samples were calculated from Brookfield dynamic viscosity measurements. Kinematic viscosity (KV) is reported in units of centistokes (cSt). The kinematic viscosity measurements were performed according to the ASTM D445-11a test protocol.

Example 1

Copolymerizations of 1-decene and 9-DAME

Copolymers were formed by reacting an alpha-olefin monomer (1-decene) and an α-ester-alk-ω-ene monomer (9-DAME). In an initial polymerization reaction, a reaction mixture was formed containing a 10:1 molar ratio of 1-decene to 9-DAME. To this mixture was added di-t-butyl peroxide or di-t-amyl peroxide as the polymerization initiator. The peroxide was added to the reaction mixture in ten equal portions. The reaction mixture was maintained at room temperature until the first peroxide addition was complete, after which the reaction mixture was heated to 150° C. In some instances, the monomers were sparged before the reaction, the reaction mixture was heated prior to adding the initiator, and/or a static inert gas atmosphere was established using an inlet on the top of the condenser rather than an inlet and outlet, which would allow flow of the inert gas through the reaction. Peroxide decomposition products were generated throughout the reaction, producing volatile alkanes, ketones and alcohols. As these decomposition products could cool the reaction temperature if left in the reaction mixture, a Dean-Stark trap was used to remove and collect moderately volatile products. The trap was separated from the reaction vessel by a Vigreux column, to inhibit carryover of monomer and/or peroxide into the trap, which would reduce the yield.

In one example, 250 grams (g) of 1-decene (Aldrich; 1.78 mol), 33 g of 9-DAME (0.178 mol) and 16.25 milliliters (mL) of di-t-butyl peroxide (density of 0.8 grams per milliliter (g/mL); 13 g; 0.089 mol) were combined to form a reaction mixture in a 1-liter, 3-necked round-bottom flask equipped with a magnetic stirrer, a gas inlet, a gas outlet, a thermometer, a Dean-Stark trap and a condenser. A low flow of nitrogen gas was established in the flask, and the reaction mixture was heated to 150° C. Once the mixture was at 150° C., another 16.25 mL of di-t-butyl peroxide (13 g; 0.089 mol) was added to the reaction mixture. The total molar amount of di-t-butyl peroxide in the reaction was equal to the molar amount of 9-DAME, which corresponded to 8.3 mole percent (mol %) of the total reaction (moles peroxide/(moles peroxide+moles monomers)=0.0833). The reaction mixture was stirred at 150° C. for 5-10 hours, and liquid in the Dean-Stark trap was removed periodically. The resulting clear product was allowed to cool to room temperature under the nitrogen flow, and was transferred to a short path distillation apparatus and then vacuum-stripped to remove unreacted monomer (1-decene and/or 9-DAME). The product yield left in the pot of the distillation apparatus was about 66%.

In another example, 112.86 g of 1-decene (Aldrich; 0.80 mol) and 14.83 g of 9-DAME (0.08 mol) were combined to form a monomer mixture in a 250 mL, 3-necked round-bottom flask equipped with a magnetic stirrer, a gas inlet, a gas outlet, a thermocouple controlled heating mantle, a Dean-Stark trap and a condenser. The monomer mixture was sparged with nitrogen for at least 1 hour, and then heated to 150° C. under a low flow of nitrogen gas. Once the mixture was at 150° C., one-tenth of the di-tert-amyl peroxide initiator was added by syringe to form a reaction mixture. As the total amount of di-t-amyl peroxide initiator used in the reaction was 24.54 g (30 mL; density of 0.82 g/mL; 0.14 mol), each addition of $1/10^{th}$ of the initiator was 3.0 mL. Aliquots of 3.0 mL of di-t-amyl peroxide were added to the reaction mixture every 30 minutes, resulting in a total addition time for the initiator of 4.5 hours. The reaction mixture typically began to reflux after 3 or 4 additions of the initiator, and liquid typically began to collect in the trap after 6 additions of the initiator. Once all the initiator was added, the reaction mixture was stirred at 150° C. for 4 hours, and then the product mixture was allowed to cool to room temperature. The flask was equipped with a short path distillation apparatus for stripping, and the product mixture was slowly heated to 200° C. under vacuum, using thermocouple-controlled heating. Stripping at 200-205° C. at a pressure below 2 torr removed the residual monomer, to a level of less than 0.25% in the product, resulting in a product left in the flask that was colorless to pale yellow, and slightly hazy. This product was filtered while warm (~70-100° C.) using a medium coarseness paper filter or a coarse fritted filter. The yield of pale yellow product was at least 85%. This example was scaled-up by carrying out the reaction in a 5-L flask, using 1,504.85 g 1-decene (10.73 mol), 197.70 g 9-DAME (1.07 mol) and 400 mL of di-t-amyl peroxide (1.88 mol). This example was further scaled-up by carrying out the reaction in a 12-L flask, using 3,762.12 g 1-decene (26.82 mol), 494.25 g 9-DAME (2.68 mol) and 1 L of di-t-amyl peroxide (4.69 mol).

Example 2

Copolymerization of 1-decene and 9-DAME—Effect of Water

The effect of water on the copolymerization of 1-decene and 9-DAME was studied by using a hydroperoxide initiator, and by using di-t-butyl peroxide initiator alone or in combination with water. The polymerization reactions were performed as described above, with reaction mixtures containing a 10:1 molar ratio of 1-decene to 9-DAME, and a reaction temperature of 155.4° C. The initiator was either t-butyl hydroperoxide solution (70 wt % in water), di-t-butyl peroxide mixed with water, or neat di-t-butyl peroxide. The amount of initiator in each copolymerization was 13.7 mol % peroxide, calculated as moles peroxide/(moles peroxide+moles monomers), and assuming a peroxide content of 70 wt % in the t-butyl hydroperoxide solution. Table 1 lists the type of initiator, reaction yield, and kinematic viscosity (KV) at 100° C. for the copolymerization reactions. The addition of water into the reaction mixture appeared to reduce both the yield and the kinematic viscosity of the copolymer.

TABLE 1

Effect of water on copolymerizations of 1-decene and 9-DAME

| Initiator | Yield (%) | KV at 100° C. (cSt) | Color |
|---|---|---|---|
| t-butyl hydroperoxide, 70 wt % in water | 11.5 | 8.44 | dark yellow |
| di-t-butyl peroxide + water | 39.5 | 15.19 | pale, slightly cloudy |
| di-t-butyl peroxide | 72.2 | 29.31 | pale, transparent |

Example 3

Copolymerization of 1-decene and 9-DAME—Effects of Peroxide Loading

Copolymers were formed by reacting 1-decene as the alpha-olefin monomer and 9-DAME as the α-ester-alk-ω-ene monomer, with different amounts of either di-t-amyl peroxide or di-t-butyl peroxide as the initiator. The copolymerization reactions were performed as described in Example 1, with reaction mixtures containing a 10:1 molar ratio of 1-decene to 9-DAME, a reaction temperature of 149.5° C. for copolymerizations using di-t-amyl peroxide, and a reaction temperature of 155° C. for copolymerizations using di-tert-butyl peroxide. Table 2 lists the amount of initiator, reaction yield, and kinematic viscosity (KV) at 100° C. for the copolymerization reactions. Both the reaction yields and the kinematic viscosities increased as the initiator loading increased. In addition, the type of initiator affected the viscosity of the copolymers. The di-t-amyl peroxide was more effective at providing a low-viscosity copolymer than was the di-t-butyl peroxide initiator.

TABLE 2

Copolymerizations of 1-decene and 9-DAME with different peroxide initiators

| Initiator | Initiator (mol %) | Reaction temp (° C.) | Yield (%) | KV at 100° C. (cSt) |
|---|---|---|---|---|
| di-t-amyl peroxide | 8.4 | 149.5 | 59.9 | 15.20 |
| di-t-butyl peroxide | 8.3 | 155 | 49.9 | 18.54 |
| di-t-amyl peroxide | 13.8 | 149.5 | 89.1 | 15.02 |
| di-t-butyl peroxide | 13.7 | 155 | 72.2 | 29.31 |

Example 4

Copolymerization of 9-DAME with Alpha-olefins other than 1-decene

Copolymers were formed by reacting an α-ester-alk-ω-ene monomer (9-DAME) and either 1-decene or 1-dodecene as the alpha-olefin monomer. The molar ratio of alpha-olefin(s) to 9-DAME was varied, with ratios of 10:1, 3:1 or 1:1. The peroxide initiator was either di-t-amyl peroxide or di-t-butyl peroxide, and the loading of the initiator was either 13.7 mol % or about 8.4 mol %. Table 3 lists the monomers, monomer ratios, type of initiator, initiator loading, reaction yield, and kinematic viscosity (KV) at 100° C. for the copolymerization reactions. In addition, the differences in the yield and in the kinematic viscosity between comparable copolymerization reactions that differed only in the identity of the alpha-olefin are listed in the table. The effect of substituting 1-dodecene for 1-decene in the copolymerizations depended on the peroxide used, the amount of peroxide, and on the molar ratio of the alpha-olefin to 9-DAME.

TABLE 3

Copolymerizations of 9-DAME with either 1-decene or 1-dodecene

| Alpha-olefin (molar ratio*) | Initiator (mol %) | Yield (%) | Yield difference | KV at 100° C. (cSt) | KV difference |
|---|---|---|---|---|---|
| 1-decene (10:1) | di-t-amyl | 93.9 | 1.7% | 19.44 | 14.3% |
| 1-dodecene (10:1) | peroxide (13.7) | 95.5 | | 22.44 | |
| 1-decene (10:1) | di-t-butyl | 60.2 | 18.7% | 21.07 | 10.4% |
| 1-dodecene (10:1) | peroxide (8.3) | 72.7 | | 23.19 | |
| 1-decene (10:1) | di-t-butyl | 80.5 | 6.4% | 32.82 | 6.8% |
| 1-dodecene (10:1) | peroxide (13.7) | 85.8 | | 35.14 | |
| 1-decene (3:1) | di-t-butyl | 68.9 | 5.5% | 17.80 | 18.9% |
| 1-dodecene (3:1) | peroxide (8.5) | 72.8 | | 23.39 | |
| 1-decene (3:1) | di-t-butyl | 87.2 | 3.8% | 31.48 | 21.2% |
| 1-dodecene (3:1) | peroxide (13.7) | 90.6 | | 38.93 | |
| 1-decene (1:1) | di-t-amyl | 95.0 | 0.6% | 28.81 | 1.3% |
| 1-dodecene (1:1) | peroxide (13.7) | 95.6 | | 29.18 | |

*Of alpha-olefin to 9-DAME.

Example 5

Copolymerization of 1-dodecene and 9-DAME—Effects of Peroxide Type and Loading

Copolymerizations were performed with 1-dodecene as the alpha-olefin monomer instead of 1-decene. The α-ester-alk-ω-ene monomer was 9-DAME, and copolymers were formed by reacting 1-dodecene and 9-DAME with different amounts of di-t-butyl peroxide initiator. The polymerization reactions were performed as described in Example 1, with reaction mixtures containing a 10:1 molar ratio of 1-dodecene to 9-DAME, and a reaction temperature of 155° C. The amount of di-t-butyl peroxide initiator was varied from 4.0 mol % to 13.7 mol %. Table 4 lists the amount of initiator, reaction yield, and kinematic viscosity (KV) at 100° C. for the copolymerization reactions.

TABLE 4

Copolymerizations of 1-dodecene and 9-DAME

| Initiator (mol %) | Yield (%) | KV at 100° C. (cSt) |
|---|---|---|
| 4.0 | 44.2 | 15.61 |
| 6.0 | 58.2 | 18.25 |
| 8.3 | 73.2 | 22.51 |
| 8.3 | 72.1 | 21.75 |
| 13.7 | 85.8 | 32.17 |

Copolymers were formed by reacting 1-dodecene and 9-DAME in a molar ratio of 10:1, using different peroxide initiators. In addition to di-t-butyl peroxide and di-t-amyl peroxide, 2,5-bis(t-butylperoxy)-2,5-dimethylhexane and t-butyl peroxybenzoate were used as polymerization initiators. The 2,5-bis(t-butylperoxy)-2,5-dimethylhexane initiator could generate two equivalents of radicals per molecule, theoretically requiring half as much initiator in a copolymerization. Table 5 lists the type and amount of initiator, reaction yield, and kinematic viscosity (KV) at 100° C. for the copolymerization reactions.

Figure 3:
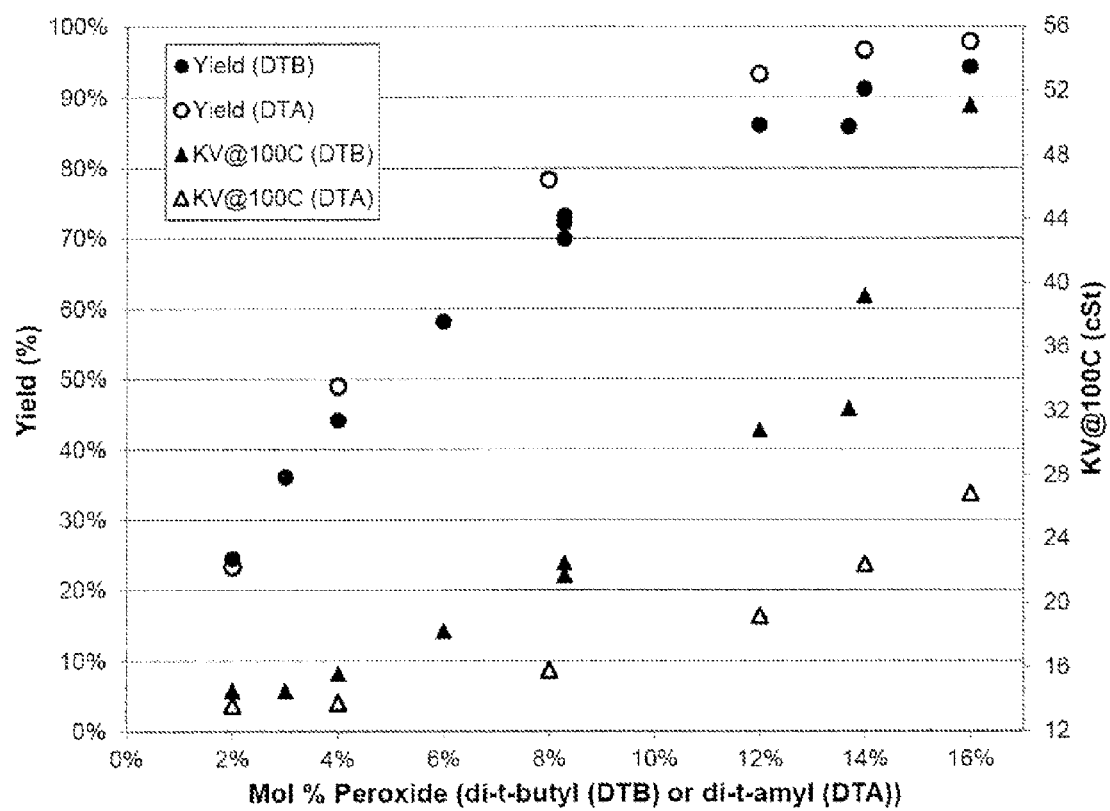
FIG. 3 is a graph of reaction yield and of copolymer composition viscosity as a function of initiator loading.

FIG. 3 is a graph of reaction yield and of copolymer viscosity as a function of initiator loading, where the data points are from Table 5. Both the reaction yields and the kinematic viscosities increased as the initiator loading increased. In addition, the type of initiator affected the viscosity of the copolymers. As shown in FIG. 3, the copolymers formed using di-t-butyl peroxide had a steeper rate of increase in kinematic viscosity (KV) with increasing initiator loading than did the copolymers formed using di-t-amyl peroxide. Accordingly, di-t-butyl peroxide was more effective at providing a high-viscosity copolymer, whereas di-t-amyl peroxide more effective at providing a low-viscosity copolymer.

TABLE 5

Copolymerizations of 1-dodecene and 9-DAME

| Initiator | Initiator mol % | Yield (%) | KV at 100° C. (cST) |
|---|---|---|---|
| di-t-butyl peroxide | 2 | 24.5 | 14.53 |
| | 3 | 36.1 | 14.53 |
| | 4 | 44.2 | 15.61 |
| | 6 | 58.2 | 18.25 |
| | 8.3 | 73.2 | 22.51 |
| | 8.3 | 72.1 | 21.75 |
| | 12 | 86.0 | 30.82 |
| | 13.7 | 85.8 | 32.17 |
| | 14 | 91.2 | 39.22 |
| | 16 | 94.3 | 51.10 |
| 2,5-bis(t-butylperoxy)-2,5-dimethylhexane | 2* | 37.7 | 15.68 |
| | 2* | 40.0 | 15.35 |
| | 4* | 64.2 | 17.73 |
| t-butyl peroxybenzoate | 8 | 64.0 | 19.52 |
| di-t-amyl peroxide | 4 | 49.0 | 13.79 |
| | 8 | 78.3 | 15.81 |
| | 12 | 93.3 | 19.20 |
| | 14 | 96.7 | 22.44 |
| | 16 | 97.9 | 26.85 |

*Equivalents of initiator = 2 × mol %; i.e. 4, 4 and 8 equivalent %, respectively.

Copolymerizations using the 2,5-bis(t-butylperoxy)-2,5-dimethylhexane initiator had a slightly lower yield than those using di-t-butyl peroxide, but both types of copolymerizations produced copolymers having similar kinematic viscosities at 100° C. The t-butyl peroxybenzoate initiator also had a lower yield, and the resulting copolymers had a light yellow color. In addition, isolating the copolymers formed using t-butyl peroxybenzoate was more difficult than in other copolymerizations, as the benzoic acid byproduct of the reaction can solidify in a distillation condenser.

Example 6

High Viscosity Lubricant Compositions Containing Copolymerization Products of 1-dodecene and 9-DAME—Effect of Stripping The viscosities of certain copolymers were increased by one or more additional stripping procedures. The copolymers analyzed had been formed by reacting 1-dodecene and 9-DAME in a molar ratio of 3:1, using di-t-butyl peroxide as the polymerization initiator, at a reaction temperature of 155° C. The copolymer formed using the lower amount of 8.3 mol % peroxide was stripped at 250° C. under a vacuum of 0.25 torr, and then further stripped at 300° C. under a vacuum of 0.5 torr. The copolymer formed using the higher amount of 13.7 mol % peroxide was stripped at 250° C. under a vacuum of 0.25 torr. Table 6 lists the amount of initiator, copolymer yield, kinematic viscosity (KV) at 100° C., kinematic viscosity (KV) at 40° C., and viscosity index.

TABLE 6

Change in yield, molecular weight and viscosity due to stripping of copolymers formed from a 3:1 molar ratio of 1-dodecene and 9-DAME

| Initiator (mol %) | Stripping | Yield (%) | $M_n$ (PDI) | KV at 100° C. (cSt) | KV at 40° C. (cSt) | VI |
|---|---|---|---|---|---|---|
| 8.3 | 200° C.; 1 torr | 72.8 | 1939 (1.65) | 21.38 | 152.56 | 165 |
| | 250° C.; 0.25 torr | 65.0* | — | 28.29 | — | — |
| | 300° C.; 0.50 torr | — | 3687 (1.15) | 26.52 | 215.57 | 157 |
| 13.7 | 200° C.; 1 torr | 90.6 | 2522 (1.89) | 38.93 | 319.54 | 174 |
| | 250° C.; 0.25 torr | 84.1* | 5946 (1.16) | 48.01 | 436.1 | 170 |

*Calculated based on weight loss from additional stripping.

Subjecting the copolymer formed using the lower amount of 8.3 mol % peroxide to stripping at 250° C. under 0.25 torr increased the kinematic viscosity at 100° C. from 21.38 to 28.29 cSt. This supplemental stripping also reduced the overall yield from 72.8% to 65.0%. Subjecting the copolymer formed using the higher amount of 13.7 mol % peroxide to stripping at 250° C. under 0.25 torr increased the kinematic viscosity at 100° C. from 38.93 to 48.01 cSt. This supplemental stripping also reduced the overall yield from 90.6% to 84.1%.

Stripping the copolymers removed lower molecular weight fractions, which contributed to lower kinematic viscosity in the original copolymers. The kinematic viscosity at 100° C. was raised above 40 cSt with the high peroxide sample (13.7 mol % peroxide). Viscosity indices were somewhat reduced by the additional stripping, but remained relatively high.

Copolymers were formed by reacting 1-dodecene and 9-DAME in molar ratios of 9:1 or 3:1, using 8 mol % di-t-butyl peroxide as the polymerization initiator. After stripping at 200° C. under a vacuum of 1 torr, the resulting copolymers were analyzed with regard to molecular weight, kinematic viscosity at 40° C. and 100° C., and viscosity index. The stripping process and analysis were repeated three times, at successively higher temperatures of 250° C., 260° C. and 275° C. Table 7 lists the comonomer ratio, stripping temperature, copolymer yield, molecular weight ($M_n$) and polydispersity (PDI), kinematic viscosity (KV) at 100° C. and 40° C., and viscosity index.

As the stripping temperature was raised, the molecular weight and kinematic viscosity of the copolymers increased, while the polydispersity and viscosity index decreased. Analysis of the distillates from each stripping process indicated that dimer and lower oligomers were removed from the copolymer, causing an increase in the average molecular weight of the copolymer and a narrowing of the polydispersity.

Copolymers were formed by reacting 1-dodecene and 9-DAME in molar ratios of 9:1, 3:1 or 1:1, using 11.3 mol % di-t-butyl peroxide as the polymerization initiator. This loading of peroxide initiator was selected as an intermediate loading between the 8-8.5 mol % peroxide and 13.7 mol % peroxide loadings used in the copolymerizations described above. As the 8-8.5 mol % and 13.7 mol % peroxide copolymerizations had provided 100° C. kinematic viscosities below 40 cSt and above 40 cSt, respectively, an intermediate peroxide loading was expected to provide a 100° C. kinematic viscosity closer to 40 cSt. The copolymerization products were stripped at 200° C. under a vacuum of 1 torr, and then analyzed with regard to molecular weight, kinematic viscosity at 40° C. and 100° C., viscosity index and pour point. The stripping process and analysis were repeated twice, at successively higher temperatures of 250° C. and 275° C. Table 8 lists the comonomer ratio, stripping temperature, copolymer yield, molecular weight ($M_n$) and polydispersity (PDI), kinematic viscosity (KV) at 100° C. and 40° C., and viscosity index.

TABLE 7

Change in yield, molecular weight and viscosity properties due to stripping, of copolymers formed using 8 mol % di-t-butyl peroxide

| 1-dodecene/ 9-DAME ratio | Stripping Temp (° C.) | Yield (%) | $M_n$ (PDI) | KV at 100° C. (cSt) | KV at 40° C. (cSt) | VI |
|---|---|---|---|---|---|---|
| 9:1 | 200 | 68.8 | 1696 (1.7) | 20.78 | 141.42 | 171 |
| | 250 | 62.6* | — | 26.80 | 210.63 | 162 |
| | 260 | 61.2* | — | 27.72 | — | — |
| | 275 | 59.3* | 2104 (1.5) | 29.10 | 245.70 | 156 |
| 3:1 | 200 | 68.6 | 1650 (1.7) | 19.72 | 137.33 | 165 |
| | 250 | 62.0* | — | 25.15 | 201.51 | 156 |
| | 260 | 59.9* | — | 26.89 | — | — |
| | 275 | 58.4* | 2047 (1.5) | 27.70 | 234.51 | 153 |

*Calculated based on weight loss from additional stripping.

TABLE 8

Change in yield, molecular weight and viscosity due to stripping of copolymers formed using 8 mol % di-t-butyl peroxide

| 1-dodecene/ 9-DAME ratio | Stripping Temp (° C.) | Yield (%) | $M_n$ (PDI) | KV at 100° C. (cSt) | KV at 40° C. (cSt) | VI |
|---|---|---|---|---|---|---|
| 9:1 | 200 | 82.2 | 1834 (1.79) | 27.68 | 217.61 | 164 |
|  | 250 | 76.5* | 2127 (1.61) | 32.42 | 297.71 | 157 |
|  | 275 | 73.9* | 2224 (1.56) | 36.61 | 336.52 | 156 |
| 3:1 | 200 | 82.3 | 1800 (1.79) | 26.57 | 206.35 | 163 |
|  | 250 | 75.7* | 2042 (1.63) | 33.91 | 299.29 | 154 |
|  | 275 | 73.5* | 2134 (1.57) | 36.52 | 338.71 | 155 |
| 1:1 | 200 | 83.3 | 1736 (1.81) | 27.29 | 223.30 | 157 |
|  | 250 | 76.6* | 1948 (1.68) | 34.92 | 319.08 | 152 |
|  | 275 | — | 1943 (1.67) | 33.85 | — | — |

*Calculated based on weight loss from additional stripping.

As the stripping temperature was raised, the molecular weight and kinematic viscosity of the copolymers generally increased, while the polydispersity and viscosity index generally decreased. The kinematic viscosities at 100° C. were still below 40 cSt, however. The pour point was measured for the copolymers of entries 1, 2, 4 and 5 in Table 8, with values of −48° C., −42° C., −45° C. and −39° C., respectively. Although the pour point increased as the stripping temperature was raised, all of the measured values were relatively low and were within the range of −22° C. to −47° C. typically observed for commercially available high-viscosity poly(alpha olefins).

Example 7

High Viscosity Lubricant Compositions Containing Copolymerization Products of 1-dodecene and 9-DAME—Effect of Peroxide Loading and Reaction Temperature Copolymers were formed by reacting an alpha-olefin monomer (1-dodecene) and an α-ester-alk-ω-ene monomer (9-DAME) in a molar ratio of 9:1, using 12 mol %, 14 mol % or 16 mol % di-t-butyl peroxide polymerization initiator, and reaction temperatures of 155° C., 165° C. or 175° C. The initiator was added in eight portions instead of ten, which decreased the reaction time by 1 hour. The copolymerization products were stripped at 200° C. under a vacuum of 1 torr, and then analyzed with regard to kinematic viscosity at 40° C. and 100° C., and viscosity index. Table 9 lists the reaction temperature, peroxide loading, reaction yield, kinematic viscosity (KV) at 100° C. and at 40° C., and viscosity index for the copolymerization reactions.

TABLE 9

Effects of reaction temperature and di-t-butyl peroxide loading on yield and viscosity of copolymers formed from a 9:1 molar ratio of 1-dodecene and 9-DAME

| Reaction Temp (° C.) | Initiator (mol %) | Yield (%) | KV at 100° C. (cSt) | KV at 40° C. (cSt) | VI |
|---|---|---|---|---|---|
| 155 | 12 | 83.6 | 29.21 | 238.54 | 161 |
|  |  | 85.1 | 30.28 | 255.75 | 158 |
|  | 14 | 89.9 | 38.85 | 349.14 | 162 |
|  | 16 | 90.1 | 40.56 | 367.18 | 163 |
|  |  | 90.7 | 41.57 | 388.25 | 160 |
| 165 | 14 | 92.1 | 40.32 | 367.50 | 161 |
|  |  | 91.7 | 39.85 | 359.68 | 162 |
| 175 | 12 | 59.0 | 31.66 | 271.54 | 158 |
|  |  | 88.2 | 33.01 | 277.00 | 163 |

TABLE 9-continued

Effects of reaction temperature and di-t-butyl peroxide loading on yield and viscosity of copolymers formed from a 9:1 molar ratio of 1-dodecene and 9-DAME

| Reaction Temp (° C.) | Initiator (mol %) | Yield (%) | KV at 100° C. (cSt) | KV at 40° C. (cSt) | VI |
|---|---|---|---|---|---|
|  | 16 | 95.0 | 53.74 | 520.57 | 167 |
|  |  | 95.7 | 55.85 | 550.81 | 167 |
|  |  | 94.6 | 54.29 | 522.43 | 169 |

Copolymers were formed by reacting 1-dodecene and 9-DAME in a different molar ratio of 4:1, using 13.4 mol % or 14.5 mol % di-t-butyl peroxide polymerization initiator, and reaction temperatures of 155° C. or 175° C. The initiator was added in ten portions. The copolymerization products were stripped at 200° C. under a vacuum of 1 torr, and then analyzed with regard to kinematic viscosity at 40° C. and 100° C., and viscosity index. Table 10 lists the reaction temperature, peroxide loading, reaction yield, kinematic viscosity (KV) at 100° C. and at 40° C., and viscosity index for the copolymerization reactions.

TABLE 10

Effects of reaction temperature and di-t-butyl peroxide loading on yield and viscosity of copolymers formed from a 4:1 molar ratio of 1-dodecene and 9-DAME

| Reaction Temp (° C.) | Initiator (mol %) | Yield (%) | KV at 100° C. (cSt) | KV at 40° C. (cSt) | VI |
|---|---|---|---|---|---|
| 155 | 14.5 | 90.8 | 40.36 | 365.11 | 161 |
|  |  | 91.9 | 40.20 | 367.11 | 161 |
| 175 | 13.4 | 91.3 | 35.64 | 318.16 | 158 |
|  |  | 91.1 | 35.19 | 306.76 | 161 |

Copolymers were formed by reacting 1-dodecene and 9-DAME in molar ratios of 9:1 or 4:1 at a reaction temperature of 175° C., using from 13.5 mol % to 15 mol % di-t-butyl peroxide polymerization initiator. The copolymerization products were stripped at 200° C. under a vacuum of 1 torr, and then analyzed with regard to kinematic viscosity at 40° C. and 100° C., and viscosity index. Table 11 lists the molar ratio of monomers, peroxide loading, reaction yield, kinematic viscosity (KV) at 100° C. and at 40° C., and viscosity index for the copolymerization reactions.

The lower viscosities for the copolymers formed at the higher reaction temperature of 175° C. may have been a result of difficulties in maintaining this temperature throughout the reaction. The potential benefit of using less peroxide initiator at this higher temperature appeared to come at the expense of obtaining a high kinematic viscosity of 40 cSt. Copolymerizations using 14 mol % peroxide at 165° C. yielded copolymers having kinematic viscosity values of from 36.7 to 40.3 cSt (see Table 9, entries 6 and 7), while copolymerizations at 175° C. using the same amount of peroxide (14 mol %) yielded copolymers having lower kinematic viscosity values of from 37.3 to 38.3 cSt (Table 11, entries 3 and 4). The yields from these two types of copolymerization were similar, with yield of the 14 mol % peroxide/165° C. copolymerizations ranging from 90.8-92.1% and the yield of the 14 mol % peroxide/175° C. combination ranging from 92.3-92.6%.

TABLE 11

Effects of comonomer molar ratio and di-t-butyl peroxide loading on yield and viscosity of 1-dodecene/9-DAME copolymers formed at 175° C.

| 1-dodecene/9-DAME ratio | Initiator (mol %) | Yield (%) | KV at 100° C. (cSt) | KV at 40° C. (cSt) | VI |
|---|---|---|---|---|---|
| 9:1 | 13.7 | 91.1 | 38.40 | 337.63 | 164 |
| 4:1 | 13.5 | 91.1 | 36.62 | 316.81 | 164 |
|  | 13.9 | 92.3 | 37.94 | 332.76 | 164 |
|  | 14 | 92.3 | 37.35 | 328.70 | 162 |
|  |  | 92.56 | 38.32 | 338.52 | 163 |
|  | 14.5 | 92.84 | 40.46 | 363.85 | 163 |
|  | 15 | 94.0 | 44.92 | 413.28 | 165 |

Example 8

High Viscosity Lubricant Compositions Containing Copolymerization Products of 1-dodecene and 9-DAME—Effect of Hydrogenation Copolymers were formed by reacting an alpha-olefin monomer (1-dodecene) and an α-ester-alk-ω-ene monomer (9-DAME) in molar ratios of 9:1 or 4:1, using from 14.3 to 14.5 mol % di-t-butyl peroxide polymerization initiator, and a reaction temperature of 165° C. The copolymerization products were stripped and then analyzed with regard to molecular weight, kinematic viscosity at 40° C. and 100° C., viscosity index, pour point and oxidation onset temperature (OOT; ASTM E2009). The 4:1 copolymerization yielded 92.0% of a copolymer having a number average molecular weight ($M_n$) of 2,498, with a polydispersity index (PDI) of 1.93; and the 9:1 copolymerization yielded 91.7% of a copolymer having a number average molecular weight ($M_n$) of 2,633, with a polydispersity index (PDI) of 1.87. The copolymers were then hydrogenated to remove carbon-carbon double bonds, and then similarly analyzed. Table 12 lists the ratio of monomers, peroxide loading, kinematic viscosity (KV) at 100° C. and at 40° C., viscosity index, molecular weight, pour point and oxidation onset temperature (OOT) for the copolymers.

TABLE 12

Effects of comonomer molar ratio and hydrogenation on viscosity and pour point of 1-dodecene/9-DAME copolymers formed at 175° C.

| 1-dodecene/9-DAME ratio | Hydro-genated | KV (cSt) 100° C. | KV (cSt) 40° C. | VI | Pour Point (° C.) | OOT (° C.) |
|---|---|---|---|---|---|---|
| 4:1 | No | 39.96 | 362.46 | 162 | −27 | 176.5 |
|  | Yes | 41.16 | 375 | 163 | −21 | 201.4 |

TABLE 12-continued

Effects of comonomer molar ratio and hydrogenation on viscosity and pour point of 1-dodecene/9-DAME copolymers formed at 175° C.

| 1-dodecene/9-DAME ratio | Hydro-genated | KV (cSt) 100° C. | KV (cSt) 40° C. | VI | Pour Point (° C.) | OOT (° C.) |
|---|---|---|---|---|---|---|
| 9:1 | No | 40.10 | 359.09 | 163 | −30 | 170.6 |
|  | Yes | 41.05 | 371 | 163 | −18 | 200.3 |

Viscosity and viscosity index were minimally affected by hydrogenation, but the pour point increased with hydrogenation. Hydrogenation improved oxidative stability of the copolymers as measured by OOT. When the non-hydrogenated copolymers were blended with 0.5% of a dialkyldiphenylamine antioxidant, the OOT increased to over 220° C. for each copolymer.

Example 9

High Viscosity Lubricant Compositions Containing Copolymerization Products of 1-dodecene and 9-DAME—Effect of Higher Peroxide Loading and Reaction Temperature Copolymers were formed by reacting an alpha-olefin monomer (1-dodecene) and an α-ester-alk-ω-ene monomer (9-DAME) in a molar ratio of 1:1, using 14-20 mol % di-t-butyl peroxide polymerization initiator, and reaction temperatures of 155° C. or 165° C. The copolymerization products were analyzed with regard to kinematic viscosity at 40° C. and 100° C., and viscosity index. Table 13 lists the reaction temperature, peroxide loading, reaction yield, kinematic viscosity (KV) at 100° C. and at 40° C., and viscosity index for the copolymerization reactions.

TABLE 13

Effects of reaction temperature and di-t-butyl peroxide loading on viscosity of copolymers formed from a 1:1 molar ratio of 1-dodecene and 9-DAME

| Reaction Temp (° C.) | Initiator (mol %) | Yield (%) | KV at 100° C. (cSt) | KV at 40° C. (cSt) | VI |
|---|---|---|---|---|---|
| 155 | 14 | 92.52 | 38.35 | 351.19 | 159 |
|  | 16 | 93.74 | 51.43 | 515.8 | 162 |
|  | 16 | 94.07 | 55.52 | 568.3 | 163 |
|  | 18 | 95.67 | 76.83 | 835.3 | 172 |
|  | 19 | 96.92 | 96.77 | 1087.02 | 178 |
|  | 20 | 97.47 | 150.36 | 1808.4 | 194 |
| 165 | 14 | 90.60 | 41.24 | 377.37 | 162 |
|  | 16 | 95.81 | 55.59 | 559.8 | 166 |
|  | 16 | 95.86 | 57.87 | 591.2 | 166 |
|  | 18 | 97.37 | 87.24 | 954.8 | 177 |
|  | 19 | 97.80 | 117.45 | 1352.82 | 185 |
|  | 20 | 98.30 | 186.99 | 2207.0 | 207 |

Figure 4:
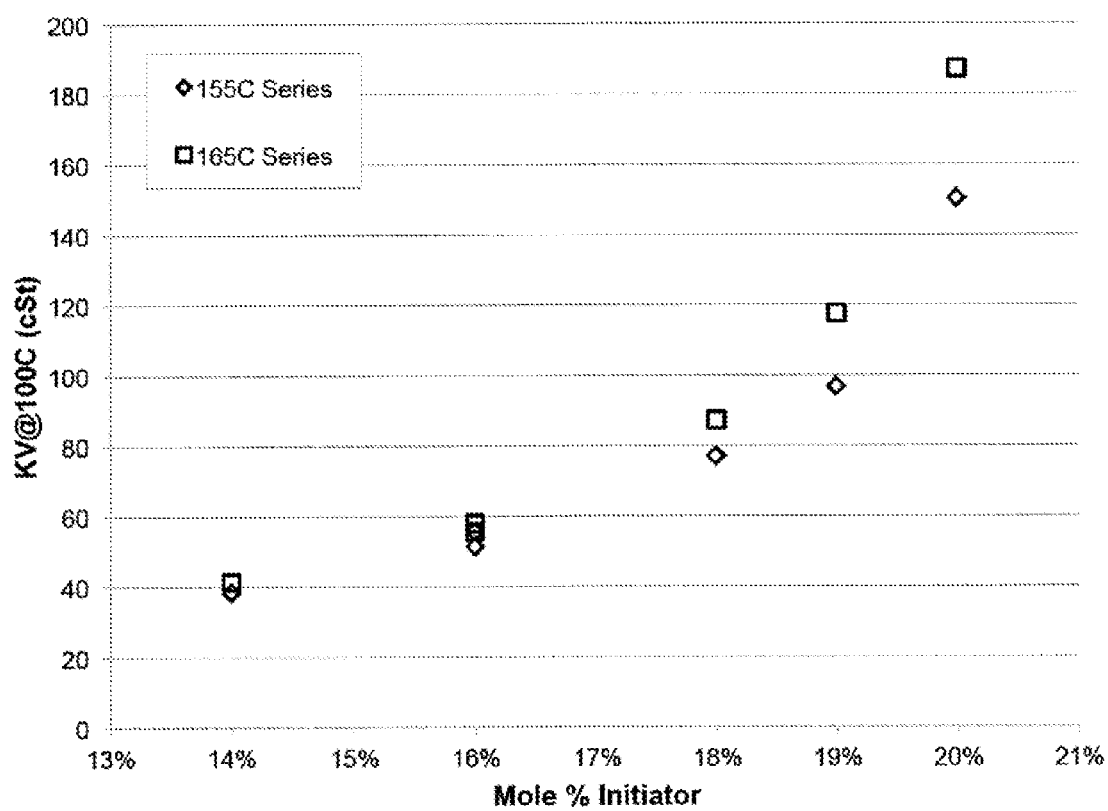
FIG. 4 is a graph of copolymer composition viscosity as a function of di-t-butyl peroxide loading.

FIG. 4 is a graph of copolymer viscosity as a function of di-t-butyl peroxide loading, where the data points are from Table 13. The diamond symbols in the graph correspond to reaction temperatures of 155° C., and the square symbols in the graph correspond to reaction temperatures of 165° C. The kinematic viscosities at 100° C. of the polymers spanned 38 to 186 cSt, and generally increased with increasing initiator loading.

Example 10

High Viscosity Lubricant Compositions Containing Copolymerization Products of 1-dodecene and 9-DAME—Effect of Two-Stage Copolymerization Copolymers were formed by reacting an alpha-olefin monomer (1-dodecene) and an α-ester-alk-ω-ene monomer (9-DAME) in a molar ratio of 1:1, using 8 mol % or 14 mol % di-t-butyl peroxide polymerization initiator and a reaction temperature of 155° C. Portions of the copolymerization product from the 8 mol % initiator reaction were subjected to a second stage of copolymerization. In the second stage, the copolymerization product was combined with additional di-t-butyl peroxide polymerization initiator and heated at 165° C. The additional initiator was added in four doses at 165° C., and the mixture was then maintained at 165° C. for 4 hours. The amounts of di-t-butyl peroxide polymerization initiator used in the second stage copolymerizations were 11.3%, 22.4%, 33.7% or 44.9% of the amount used in the initial copolymerization, which used 8 mol %. Thus, the total amount of initiator used in the two-stage copolymerization in which the second stage used 44.9% of the amount of initiator of the initial copolymerization was equal to the amount of initiator present in the one-stage copolymerization that used 14 mol % initiator.

The copolymerization products, both from one-stage reactions and two-stage reactions, were analyzed with regard to kinematic viscosity at 40° C. and 100° C., viscosity index and molecular weight. Table 14 lists the reaction conditions, reaction yield, kinematic viscosity (KV) at 100° C. and at 40° C., viscosity index and molecular weight for the copolymerization reactions. The reaction yields for the two-stage reactions are overall yields for both stages, as yield for the second stages were approximately quantitative.

The two-stage reaction with the highest peroxide loading (A+44.9% more initiator) gave a kinematic viscosity at 100° C. of 75.16 cSt, which was greater than that obtained using the same amount of initiator but in a one-stage reaction ("C"; kinematic viscosity at 100° C.=38.35 cSt). Surprisingly, a viscosity approximately equal to that of this one-stage reaction was obtained by using only half the additional amount of initiator, which corresponds to the two-stage reaction identified as "A product+11.3% more initiator" (kinematic viscosity at 100° C.=38.23 cSt).

The two-stage reaction identified as "A product +33.7% more initiator" had a kinematic viscosity at 100° C. of 54.07 cSt. This viscosity was similar to those reported in Table 13 for the reactions that used 16 mol % initiator at 165° C. (kinematic viscosities at 100° C.=55.59 and 57.87 cSt); however, the two-stage copolymerization used 16.4% less initiator than did the one-stage copolymerizations.

Surprisingly, viscosity index was not reduced in the copolymers formed using the two-stage copolymerizations. It is presently believed that volatility of the two-stage products should be less than that of the one-stage products, as low molecular weight species that remain after the first stage stripping are likely to react in the second stage.

Example 11

High Viscosity Lubricant Compositions Containing Copolymerization Products of 1-dodecene and α-ester-alk-ω-enes Having Different Ester Groups Copolymers were formed by reacting an alpha-olefin monomer (1-dodecene) and an α-ester-alk-ω-ene monomer in a molar ratio of 4:1, using approximately 14 mol % di-t-butyl peroxide polymerization initiator and a reaction temperature of 155° C. A 4:1 molar ratio of alpha-olefin (1-dodecene) (90.05 g) and α-ester-alk-ω-ene monomer (2-propyl 9-decenoate) (28.40 g) was heated to 155° C. in an 250 mL three neck flask equipped with magnetic stirring, heating mantle and a Dean-Starke trap. At 30-minute intervals 2 mL doses of di-t-butyl peroxide were added for a total of 20 mL (15.92 g) of peroxide. After peroxide addition was complete, the reaction stirred at 155° C. for an additional 4 hours. Stripping the reaction mixture at 0.5 torr and 200° C. yielded a viscous pale yellow product. Using the same procedure, 4:1 molar ratio copolymers using methyl, n-pentyl, 4-methyl butyl, n-octyl, and 2-ethyl hexyl variations of α-ester-alk-ω-ene monomers were made. The copolymerization products were analyzed with regard to kinematic viscosity at 40° C. and 100° C., and viscosity index. Table 15 lists the peroxide loading, reaction yield, kinematic viscosity (KV) at 100° C. and at 40° C., and viscosity index for the copolymerization reactions.

TABLE 14

Effects of two-stage copolymerization on yield, viscosity and molecular weight of 1:1 1-dodecene/9-DAME copolymers

| Description | Yield (%) | KV (cSt) | | VI | Molecular weight (daltons) | | PDI |
|---|---|---|---|---|---|---|---|
| | | 100° C. | 40° C. | | $M_n$ | $M_w$ | |
| 1-step "A"; 8 mol % initiator | 69.98 | 18.68 | 134.44 | 157 | 1579 | 3021 | 1.91 |
| 1-step control "C"; 14 mol % initiator | 92.52 | 38.35 | 351.19 | 159 | 2182 | 5383 | 2.47 |
| 2-step: A product + 11.3% more initiator | 69.89 | 25.13 | 199.60 | 158 | 1806 | 3912 | 2.17 |
| 2-step: A product + 22.4% more initiator | 69.95 | 38.23 | 342.50 | 161 | 2108 | 5508 | 3.14 |
| 2-step: A product + 33.7% more initiator | 69.98 | 54.07 | 527.85 | 167 | 2408 | 7569 | 3.14 |
| 2-step: A product + 44.9% more initiator | 69.93 | 75.16 | 792.29 | 173 | 2666 | 10332 | 3.88 |

TABLE 15

Effects of ester structure on yield and viscosity of
1-dodecene/α-ester-alk-ω-ene copolymers

| Ester group | Initiator (mol %) | Yield (%) | KV at 100° C. (cSt) | KV at 40° C. (cSt) | VI |
|---|---|---|---|---|---|
| methyl | 14.0 | 92.1 | 41.67 | 373.87 | 165 |
| methyl | 14.5 | 94.0 | 44.93 | 413.28 | 165 |
| isopropyl | 14.0 | 91.8 | 43.27 | 383.99 | 168 |
| n-pentyl | 14.0 | 92.8 | 43.98 | 372.46 | 175 |
| 3-methyl butyl | 14.0 | 93.1 | 46.55 | 412.51 | 172 |
| n-octyl | 14.0 | 95.2 | 53.01 | 452.81 | 182 |
| 2-ethyl hexyl | 14.0 | 94.0 | 49.81 | 442.19 | 175 |
| methyl diglycol | 14.0 | 95.6 | 55.54 | 488.59 | 181 |

Surprisingly, the two copolymers formed using pentyl ester comonomers had higher kinematic viscosity (KV) at 100° C. and had higher viscosity indices than the control copolymer formed from 9-DAME comonomer using 14 mol % initiator. In addition, the n-pentyl ester comonomer provided both a higher kinematic viscosity (KV) at 100° C. and a lower kinematic viscosity (KV) at 40° C. than the control copolymer. The copolymers using linear esters provided a higher viscosity index than their branched counterparts. It may be desirable to affect viscosity index while only moderately affecting kinematic viscosity (KV) at 100° C. in lubricant compositions intended for use over a range of temperatures, such as automotive lubricants.

Example 12

Comparison to 40-Centisktoke PAO

Three samples of alpha-olefin copolymer were prepared using varying ratios of an alpha olefin (1-dodecene), and α-ester-alk-ω-ene monomer (9-DAME), in molar ratios of 9:1, 3:1 and 1:1, identified as Samples 1, 2, and 3, respectively. For Sample 1, a mixture of 1-dodecene (1-DD) (443.83 g) and 9-decenoic acid methyl ester (9-DAME) (53.99 g) were heated to 160° C. in a 1000 mL three neck flask equipped with magnetic stirring, heating mantle and a Dean-Starke trap. At 30-minute intervals, 7 mL doses of di-t-butyl peroxide were added for a total of 84 mL (66.86 g) of peroxide. After peroxide addition was complete, the reaction stirred at 160° C. for an additional 4 hours. Stripping the reaction mixture at 0.6 torr and 200° C. yielded a viscous pale yellow product. Sample 2 was made similarly using a 3:1 molar ratio of 1-DD to 9-DAME, and Sample 3 was made using a 1:1 molar ration of 1-DD to 9-DAME. Samples 1, 2 and 3, respectively, were compared to 40-centistoke-rated commercial-grade poly(alpha-olefin) (PAO). The following variables were tested for comparison: kinematic viscosity (KV) at 100° C., kinematic viscosity (KV) at 40° C., viscosity index (VI), pour point, NOACK volatility, aniline point, dielectric constant, and Brookfield viscosity at −26° C. The results of the comparative testing are shown below in Table 16.

TABLE 16

Effects of ester structure on yield and viscosity of
1-dodecene/α-ester-alk-ω-ene copolymers

| Property | PAO (40 cSt)* | Sample 1 | Sample 2 | Sample 3 |
|---|---|---|---|---|
| KV at 100° C. (cSt) | 39.0 | 39.39 | 39.39 | 39.36 |
| KV at 40° C. (cSt) | 396.0 | 355.06 | 358.01 | 354.75 |
| Viscosity Index | 147 | 162 | 161 | 162 |
| Pour Point | −33 | — | — | — |
| NOACK Volatility | 3.0 | — | — | — |
| Aniline Point | 159.6 | — | — | — |
| Dielectric Constant | 2.15 | — | — | — |
| Brookfield Viscosity at −26° C. (cP) | 102,000 | — | — | — |

*SpectraSyn 40

Example 13

Transesterification of Alpha-Olefin Copolymer

The alpha-olefin copolymer of Sample 1 of Example 12 was transesterified using two separate polyols: neopentyl glycol ("NPG") and 1,1,1-tris(hydroxymethyl)propane ("TMP"). For the NPG-modified copolymers ("NPG-Mod"), 100 g of Sample 1, 5.31 g of NPG, and 2-3 g of p-toluenesulfonic acid were combined in 150 mL of octane in a 3-neck 500 mL round bottom flask with a stir bar, dean stark trap, condenser, nitrogen bubbler, thermocouple, and heating mantle. The flask was gradually heated to 130° C. for 1 hr., then increased to 145° C. for 1 hr., then increased to 160° C. for 2 hrs., then increased to a final temperature of 180° C. for 3 hrs. The flask was then cooled to room temperature and 2-3 g $K_2CO_3$ was added and stirred for 1-1.5 hrs. The material was then distilled at 2 torr, 170° C. for 2 hrs. and then filtered through celite. A yield of 68.2% was obtained. For the TMP-modified copolymers, 100 g of Sample 1, 4.43 g of TMP ("TMP-Mod-1") or 2.40 g of TMP ("TMP-Mod-2"), and 2-3 g of p-toluenesulfonic acid were combined in 150 mL of octane in a 3-neck 500 mL round bottom flask with a stir bar, dean stark trap, condenser, nitrogen bubbler, thermocouple and heating mantle. The flask was gradually heated to 130° C. for 1-1.5 hrs., then increased to 145° C. for 6 hrs. The nitrogen flow was placed under the liquid level for the last 1 hr. The flask was then cooled to room temperature and 2-3 g $K_2CO_3$ was added to the flask and stirred for 1-1.5 hrs. The material was then distilled at 2 torr, 170° C. for 2 hrs. and then filtered through celite. A yield of 70% was obtained. Table 17 below shows the kinematic viscosity at 40° C. and 100° C., the viscosity index, the pour point, and the dielectric constant for the NPG-Mod sample and the TMP-Mod sample.

TABLE 17

Effects of transesterification on properties of 1-
dodecene/α-ester-alk-ω-ene copolymers

| Property | NPG-Mod | TMP-Mod-1 | TMP-Mod-2 |
|---|---|---|---|
| KV at 100° C. (cSt) | 55.5 | 68.7 | 51.7 |
| KV at 40° C. (cSt) | 552.9 | 727.3 | 521.0 |
| Viscosity Index | 166 | 169 | 160 |
| Pour Point (° C.) | −27 | −21 | −27 |
| Dielectric Constant | — | 2.58 | — |

Example 14

Modification of Alpha-Olefin Copolymer with Polyalkylenepolyamine

The alpha-olefin copolymer of Sample 1 of Example 12 was reacted with diethylenetriamine: 200 g of Sample 1 and 10.3 g of diethylenetriamine were heated to 170° C. and the reaction mixture at this temperature for 5 hours while removing the resulting methanol by-product out. At the end of this duration, vacuum was applied to remove any remaining volatiles, and the product filtered using Celite. The product, dark amber viscous material, was obtained in 80% yield. It had a kinematic viscosity of 52.9 cSt at 100° C., a kinematic viscosity of 552.8 cSt at 40° C., and a viscosity index of 158.

Example 15

Copolymerization of Higher-Order Esters

Copolymers were formed by reacting an alpha-olefin monomer and an α-ester-alk-ω-ene monomer in a molar ratio of 9:1, using approximately 14 mol % di-t-butyl peroxide polymerization initiator and a reaction temperature of 155° C. A 9:1 molar ratio of alpha-olefin (1-octene) (86.57 g) and α-ester-alk-ω-ene monomer (9-DAME) (15.80 g) was heated to 155° C. in an 250 mL three neck flask equipped with magnetic stirring, heating mantle and a Dean-Starke trap. At 30-minute intervals 2.5 mL doses of di-t-butyl peroxide were added for a total of 25 mL (19.90 g) of peroxide. After peroxide addition was complete, the reaction stirred at 155° C. for an additional 4 hours. Stripping the reaction mixture at 0.5 torr and 200° C. yielded a viscous pale yellow product. Using the same procedure, 9:1 molar ratio copolymers using 1-decene, 1-dodecene, 1-tetradecene, 1-hexadecene, and 1-octadecene alpha-olefin monomers with 9-DAME were made.

The copolymerization products were analyzed with regard to kinematic viscosity at 40° C. and 100° C., and viscosity index. Table 18 lists the peroxide loading, reaction yield, kinematic viscosity (KV) at 100° C. and at 40° C., and viscosity index for the copolymerization reactions.

TABLE 18

Effects of alpha-olefin length on yield and viscosity of alpha-olefin/α-ester-alk-ω-ene copolymers

| alpha-olefin | Initiator (mol %) | Yield (%) | KV at 100° C. (cSt) | KV at 40° C. (cSt) | VI |
| --- | --- | --- | --- | --- | --- |
| 1-octene | 14.0 | 35.91 | 18.65 | 155.61 | 135 |
| 1-decene | 14.5 | 85.54 | 30.05 | 263.53 | 153 |
| 1-dodecene | 14.0 | 90.26 | 36.56 | 327.23 | 159 |
| 1-tetradecene | 14.0 | 92.32 | 50.12 | 446.53 | 174 |
| 1-hexadecene | 14.0 | 93.07 | 62.52 | 568.98 | 182 |
| 1-octadecene | 14.0 | 94.83 | 79.78 | 735.29 | 192 |

Example 16

Scale-Up of 1-Dodecene/9-DAME Copolymer Composition

The copolymer was formed by reacting 1-dodecene and 9-DAME in molar ratio of 3:1 in a 100-L stainless steel reactor. The reactor was charged with 30.38 kg 1-dodecene and 11.17 kg 9-DAME. After purging with nitrogen overnight, the reactor was sealed and the mixture was heated to 160° C. A total of 5.37 kg di-t-butyl peroxide was added to the reaction mixture in 12 equal portions at 30-minute intervals using a pressurized vessel and leak-tight delivery line to feed the initiator below the reaction mixture liquid surface. Once all the initiator was added, the reaction mixture was stirred at 160° C. for four hours then allowed to cool to ambient temperature. Using a wiped film evaporator, the product mixture was stripped at 200° C. using a flow rate of 30-35 mL/min and a pressure between 1 and 5 torr to remove the residual monomer to a level of less than 0.25% in the product. The resulting pale yellow product was filtered at 70° C. using a medium coarseness paper filter. The yield of product was 92.1%. Properties of the scaled-up sample are shown in Table 19 and are compared to 40-cSt PAO. Properties of the scaled-up sample are shown in Table 19 and are compared to 40-cSt PAO.

TABLE 19

1-Dodecene/α-ester-alk-ω-ene copolymer composition properties compared to PAO

| Property | PAO (40 cSt)* | Sample |
| --- | --- | --- |
| KV at 100° C. (cSt) | 39.0 | 37.1 |
| KV at 40° C. (cSt) | 396.0 | 323.4 |
| Viscosity Index | 147 | 163 |
| Pour Point | −33 | −30 |
| NOACK Volatility | 3.0 | 3.30 |
| Aniline Point | 159.6 | 97 |

*SpectraSyn 40

Example 17

Hydrogenation of Scaled-Up of 1-Dodecene/9-DAME Copolymer Composition

Under a $N_2$ atmosphere, a 600 mL autoclave was charged with 2.0 wt % of 10% palladium on carbon catalyst (Aldrich, Item No. 330108, Sigma-Aldrich, St. Louis, Mo., USA) with respect to the substrate (7.0 g of catalyst per 350 g of substrate). Approximately 350 g of the composition from Example 16 was then added to the vessel, and the assembly was attached to a pressure head. A $N_2$ purge and pressure check was performed on the sealed autoclave. The vessel was then pressurized to 50 psi with $H_2$ (UHP, Airgas, Radnor Twp., Pa., USA). At this point, the mixture was stirred, targeting 1000 rpm. Temperature and hydrogen pressure were gradually raised to a maximum of 200° C./350 psi respectively. These conditions were maintained until either the uptake of hydrogen ceased or saturation reached its theoretical maximum amount. Once the reaction was deemed complete, a $N_2$ purge was performed to displace hydrogen from the autoclave. The catalyst/product slurry was discharged from the reactor. The mixture was then filtered through a bed of CELITE under an atmosphere of $N_2$ to remove catalyst. After hydrogenation, the sample was determined to have an iodine value of 2.88 cg/g. Additional properties of the hydrogenated scaled-up sample are shown in Table 20 and are compared to 40-cSt PAO.

TABLE 20

Hydrogenated 1-dodecene/α-ester-alk-ω-ene copolymer composition properties compared to PAO

| Property | PAO (40 cSt)* | Sample |
|---|---|---|
| KV at 100° C. (cSt) | 39.0 | 38.5 |
| KV at 40° C. (cSt) | 396.0 | 348.1 |
| Viscosity Index | 147 | 161 |

*SpectraSyn 40

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A composition, comprising:
a copolymer comprising constitutional units formed from two or more monomers, the two or more monomers comprising
a first monomer, which is 1-dodecene, and
a second monomer, which is an α-ester-alk-ω-ene molecule;
where the mole-to-mole ratio of the first monomer to the second monomer is from 2:1 to 5:1; and
where the composition has a kinematic viscosity at 100° C. of 25 to 200 centistokes.

2. The composition of claim 1, where the second monomer is a compound of formula (I):

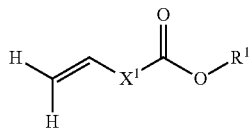

(I)

wherein
$R^1$ is $C_{1-12}$ alkyl, which is optionally substituted one or more times by substituents selected independently from $R^2$;
$R^2$ is halogen, —OH, $C_{1-6}$alkoxy, —NH$_2$, —NH($C_{1-6}$ alkyl), —N($C_{1-6}$alkyl)$_2$, $C_{1-6}$ haloalkyl, or $C_{1-6}$haloalkoxy; and
$X^1$ is $C_{1-24}$ alkylene or $C_{2-24}$ alkenylene, each of which is optionally substituted one or more times by substituents selected independently from $R^2$.

3. The composition of claim 2, where $R^1$ is methyl, ethyl, propyl, isopropyl, butyl, sec-butyl, isobutyl, tert-butyl, pentyl, isoamyl, neopentyl, hexyl, octyl, or 2-ethylhexyl.

4. The composition of claim 3, where $R^1$ is methyl, ethyl, or isopropyl.

5. The composition of claim 4, where $R^1$ is methyl.

6. The composition of claim 2, where $X^1$ is —(CH$_2$)$_7$— or —(CH$_2$)$_9$—.

7. The composition of claim 6, where $X^1$ is —(CH$_2$)$_7$—.

8. The composition of claim 1, where the composition has a kinematic viscosity at 100° C. of 25 to 150 centistokes.

9. The composition of claim 1, where the copolymer is formed by free radical polymerization.

10. The composition of claim 9, where the free radical polymerization is carried out in the presence of a free radical initiator.

11. The composition of claim 10 where the polymerization initiator is a peroxide, a persulfate, a hydroperoxide, a perester, an azo compound, a photoinitiator, or a combination thereof.

12. The composition of claim 11, wherein the polymerization initiator is an organic peroxide.

13. The composition of claim 12, where the organic peroxide is di-tert-butyl peroxide, di-tert-amyl peroxide, or a combination thereof.

14. A lubricant composition, comprising:
a composition of claim 1.

15. A method for making a lubricant composition, the method comprising:
providing a composition of claim 1 and a diluent, where the diluent is miscible with the composition; and
mixing the composition and the diluent to form a diluted composition.

16. A method of making an alpha-olefin copolymer composition, comprising:
providing a composition of claim 1; and
at least partially hydrogenating the copolymers in the composition.

17. A method of making an alpha-olefin copolymer composition, comprising:
providing a composition of claim 1; and
transesterifying the copolymers by reacting the copolymers with one or more alcohols.

18. The composition of claim 1, wherein the second monomer is methyl 9-decenoate.

* * * * *